US012780106B2

(12) United States Patent
Turgeon

(10) Patent No.: US 12,780,106 B2
(45) Date of Patent: Nov. 3, 2026

(54) UNIVERSAL COMPACT TRACTOR STORAGE

(71) Applicant: Otis Innovation, LLC, Readfield, ME (US)

(72) Inventor: Jacob Turgeon, Readfield, ME (US)

( * ) Notice: Subject to any disclaimer, the term of this patent is extended or adjusted under 35 U.S.C. 154(b) by 106 days.

(21) Appl. No.: 18/929,897

(22) Filed: Oct. 29, 2024

(65) Prior Publication Data

US 2025/0136008 A1 May 1, 2025

Related U.S. Application Data

(60) Provisional application No. 63/594,687, filed on Oct. 31, 2023.

(51) Int. Cl.
*B60R 9/06* (2006.01)

(52) U.S. Cl.
CPC .................................... *B60R 9/06* (2013.01)

(58) Field of Classification Search
CPC .......... B60D 1/52; B60D 1/481; B60D 1/167; B60D 1/075; B60R 9/06; B60R 11/00; B60R 2011/004; B60R 9/065
USPC ....... 224/555, 547, 564, 558, 519, 521, 410; 280/497
See application file for complete search history.

(56) References Cited

U.S. PATENT DOCUMENTS 8,166,695 B2 * 5/2012 Pippin .................... F41A 23/06 42/94
8,251,265 B2 * 8/2012 Grudek ................. B62D 43/02 224/521
8,276,932 B2 * 10/2012 Columbia ............... B60D 1/52 280/495
8,893,939 B2 * 11/2014 Brass ...................... B60D 1/60 224/558
2003/0184048 A1 * 10/2003 Bonde ...................... B60D 1/58 280/491.5
2008/0168929 A1 * 7/2008 Thompson ............... B60D 1/38 108/44

* cited by examiner

*Primary Examiner* — Corey N Skurdal
(74) *Attorney, Agent, or Firm* — Verrill Dana, LLP; Robert L. Hover

(57) ABSTRACT

Provided herein are universal compact tractor storage systems including a mounting bracket having opposing vertical mounting supports, the supports spaced apart to receive at least one of an upper hook yoke of a quick hitch or a center link yoke of a quick hitch therebetween, at least two mounting holes formed in each support, the mounting holes positioned to align with one or more holes of the upper hook yoke or the center link yoke and to receive a mounting bolt or pin extending through the upper hook yoke or the center link yoke therethrough, and a baseplate including a payload support plate and opposing assembly tabs spaced apart to receive the vertical mounting supports therebetween, the assembly tabs including at least one bracket assembly hole corresponding to a baseplate assembly hole of one of the vertical mounting supports and sized to receive an assembly bolt or pin therethrough.

19 Claims, 36 Drawing Sheets

UNIVERSAL COMPACT TRACTOR STORAGE

CROSS REFERENCE TO RELATED APPLICATION

This application claims benefit under 35 U.S.C. § 119(e) of U.S. Provisional Application No. 63/594,687, filed on 31 Oct. 2023, entitled "UNIVERSAL COMPACT TRACTOR STORAGE," the entirety of which is incorporated by reference herein.

BACKGROUND

Compact and sub-compact utility tractors inherently lack adequate storage space and compartments, largely due to their nature and the compact physical attributes of the machines. However, with the ever-growing abundance of attachments available for residential and utility tractors, the demand to be able to store convenient or necessary items/payloads has thereby increased. These include, but are not limited to, tools, gloves, shackles, rigging, hydration bottles, chainsaws, personal protective equipment, phones, radios, bug spray, fire extinguishers, and food, etc. Little has been done to provide an affordable solution that matches the robust nature of the tractor and provides the storage volume to carry these items. Additionally, the user is limited to the original, if any, storage box provided by the OEM, which in most cases is meager and light duty. Storage solutions are also dependent on what the tractor has for add-ons, as many of these attachments will physically inhibit a storage system from being mounted. Many such implements or attachments can be mounted to a tractor using a standard 3-point quick hitch having an adjustable upper hook. Such devices are shown, for example, in FIGS. 1-3.

Typically, when faced with a choice between equipping a needed implement or transporting payload items, the user would choose to use the implement rather than the storage compartment in such a case. Accordingly, it would be preferred if there was such a storage system that was not limited by the OEM or the attachments fixed to the tractor and could be customized at the discretion of the user.

SUMMARY

Described herein are two-piece universal compact tractor storage systems configured to mount onto either an upper hook yoke or a center link yoke of a standard 3-point quick hitch having an upper hook. The storage systems include a mounting bracket sized to be fitted around either the upper hook yoke or the center link yoke of the quick hitch and a baseplate removably assemblable to the mounting bracket and configured to receive and support one or more payloads. This design permits a user to fix the mounting bracket of the storage system to the quick hitch and permits simple and quick removal of the mounting plate. In use, the storage system can remain attached to the quick hitch without inhibiting the operator from simultaneously attaching, detaching, changing, or using 3-point hitch implements on the same quick hitch.

In some embodiments, the mounting bracket can be sized to be fitted around an upper hook yoke of the quick hitch, using the mounting pin holes of the upper hook yoke itself to secure the mounting bracket to the hitch. Alternatively, in some embodiments, the mounting bracket can be sized to be fitted around a center link yoke of the quick hitch, using the mounting pin hole of the center link yoke itself to secure the mounting bracket to the hitch. Because there are currently multiple manufactures and models of 3-point quick hitches, each such storage system may include a mounting bracket having a width, hole size, and/or hole spacing configuration specific to a particular make and model of quick hitch.

The baseplate can be fixed to the mounting bracket with a single through bolt or pin to allow rigid coupling of the two pieces, while still providing for quick and easy removal from the mounting bracket. The baseplate can include a multitude of pre-drilled holes and/or slots for accommodating nearly any payload, including, for example, a storage compartment, a box, or any other object that will meet the needs of the user and fit on the tractor. Such payload can be attached to the baseplate, using the provided holes, slots, and/or any other feature of the baseplate, by any suitable means, including, for example, by being bolted, strapped, adhered, or otherwise attached or secured to the baseplate.

The payload can generally be anything the user would like that fits the user's needs and falls within the size and space limitations of the tractor and the weight-bearing limits of the storage system. Because the storage system is configured to be universal rather than requiring a specific standard payload, there are limitless possibilities for user configuration. Payloads can include anything from a milk crate to a toolbox to an ammo can, fuel tanks or cans, a pail or bucket, a tool rack, a tray, or any other object the user wishes to transport or carry on the tractor.

In addition, because the baseplate is removable from the mounting bracket, the user can advantageously have a variety of payloads, each attached to a separate baseplate. In this manner, when swapping payloads, instead of laboriously removing a first payload and then attaching a second, the user can quickly and easily remove a current baseplate carrying the first payload and attach another base plate carrying the second payload. During such a swap the mounting bracket can remain attached to the quick hitch. In this manner, using a single mounting bracket, the user can have a customized, rapidly interchangeable set of payloads for storage and/or object transport.

Accordingly, in some applications, the universal compact tractor storage system including both the mounting bracket and one or more baseplates can be provided as a kit. In other applications, each component of the storage system may be available separately, thereby increasing versatility.

In one aspect, a universal compact tractor storage system is provided. The system includes a mounting bracket including opposing vertical mounting supports, the vertical mounting supports spaced apart to receive at least one of an upper hook yoke of a quick hitch or a center link yoke of a quick hitch therebetween. The system also includes at least two mounting holes formed in each vertical mounting support, the mounting holes positioned to align with one or more holes of the upper hook yoke or the center link yoke and to receive a mounting bolt or mounting pin extending through the upper hook yoke or the center link yoke therethrough. The system also includes a baseplate including a payload support plate and opposing assembly tabs extending substantially perpendicular to the payload support plate, the opposing assembly tabs spaced apart to receive the vertical mounting supports therebetween, each of the assembly tabs including at least one bracket assembly hole corresponding to and aligned with a baseplate assembly hole of one of the vertical mounting supports and sized to receive an assembly bolt or assembly pin therethrough.

In some embodiments, the mounting bracket further also includes a front flange extending between front edges of the opposing vertical mounting supports. In some embodiments, the mounting bracket further also includes a rear flange extending between rear edges of the opposing vertical mounting supports. In some embodiments, a lower one of the mounting holes of each vertical mounting support is an open slot hole. In some embodiments, the lower open slot holes of the mounting bracket are securable to the mounting bolt or mounting pin of the upper hook yoke of the quick hitch without removal of the mounting bolt or mounting pin from the quick hitch. In some embodiments, the assembly tabs each include a width sized to be inserted between the front and rear flanges. In some embodiments, the assembly tabs are sized to engage the front and rear flanges to prevent tipping of the baseplate relative to the mounting bracket. In some embodiments, the payload support plate includes a plurality of holes and/or slots formed therein. In some embodiments, the plurality of holes and/or slots are configured to permit securement of a payload. In some embodiments, the payload includes one or more of a storage compartment, a box, a milk crate, a toolbox, an ammo can, a fuel tank, a fuel can, a pail, a bucket, a tool rack, a tray, tools, gloves, shackles, rigging, hydration bottles, chainsaws, personal protective equipment, phones, radios, bug spray, fire extinguishers, food, or combinations thereof.

In some embodiments, the payload is attachable to the baseplate by one or more of bolting, strapping, adhesion, or combinations thereof. In some embodiments, the payload support plate includes one or more sides. In some embodiments, two or more of the sides are longer than the assembly tabs. In some embodiments, at least one of the sides includes one or more holes and/or slots formed therein. In some embodiments, the payload support plate and the assembly tabs are constructed from a single piece, wherein the assembly tabs are folded perpendicular to the payload support plate. In some embodiments, the payload support plate, the assembly tabs, and the sides are constructed from a single piece, wherein the assembly tabs and the sides are folded perpendicular to the payload support plate. In some embodiments, the vertical mounting supports are substantially straight and a spaced apart distance between the vertical mounting supports is substantially constant. In some embodiments, the vertical mounting supports are symmetrically shaped to provide a varying spaced apart distance between the vertical mounting supports wherein a first spaced apart distance between the vertical mounting supports along an upper portion thereof including the baseplate assembly holes is different than a second spaced apart distance between the vertical mounting supports at a lower portion thereof including the at least two mounting holes.

In another aspect, a universal compact tractor storage kit is provided. The kit includes a mounting bracket. The mounting bracket includes opposing vertical mounting supports, the vertical mounting supports spaced apart to receive an upper hook yoke of a quick hitch or a center link yoke of a quick hitch therebetween. The mounting bracket also includes at least two mounting holes formed in each vertical mounting support, the mounting holes positioned to align with one or more holes of the upper hook yoke or the center link yoke and to receive a mounting bolt or mounting pin extending through the upper hook yoke or the center link yoke therethrough. The kit also includes a baseplate. The baseplate includes a payload support plate. The baseplate also includes opposing assembly tabs extending substantially perpendicular to the payload support plate, the opposing assembly tabs spaced apart to receive the vertical mounting supports therebetween, each of the assembly tabs including at least one bracket assembly hole corresponding to and aligned with a baseplate assembly hole of one of the vertical mounting supports and sized to receive an assembly bolt or assembly pin therethrough.

In some embodiments, the kit also includes at least one additional baseplate. In some embodiments, the kit also includes the assembly bolt and/or the assembly pin. In some embodiments, the kit also includes the mounting bolt and/or the mounting pin.

DETAILED DESCRIPTION

Figure 1:
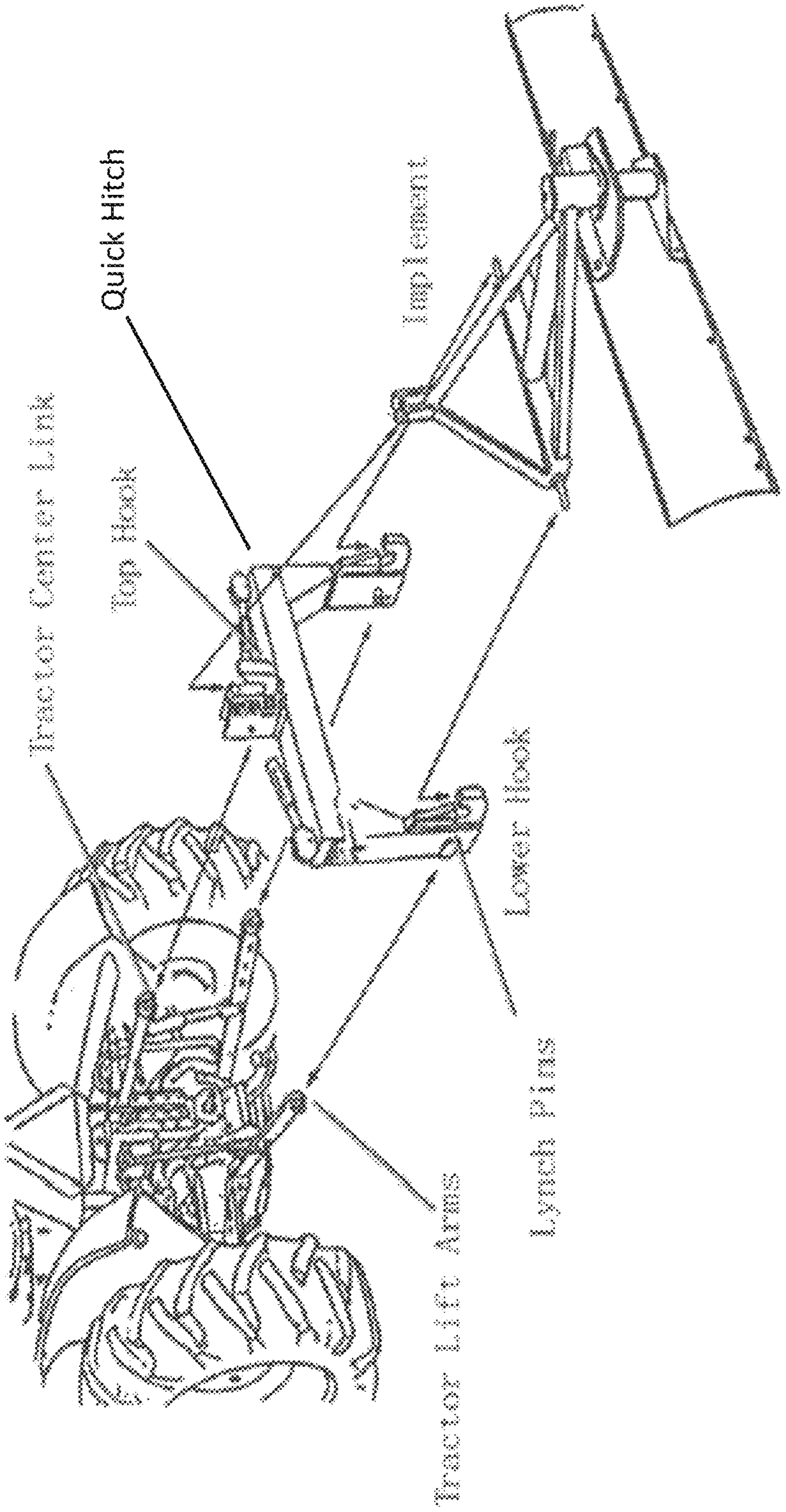
PRIOR ART FIG. 1
FIG. 1 illustrates a typical quick hitch as attached between a tractor and a plow implement in accordance with the prior art.
Figure 2:
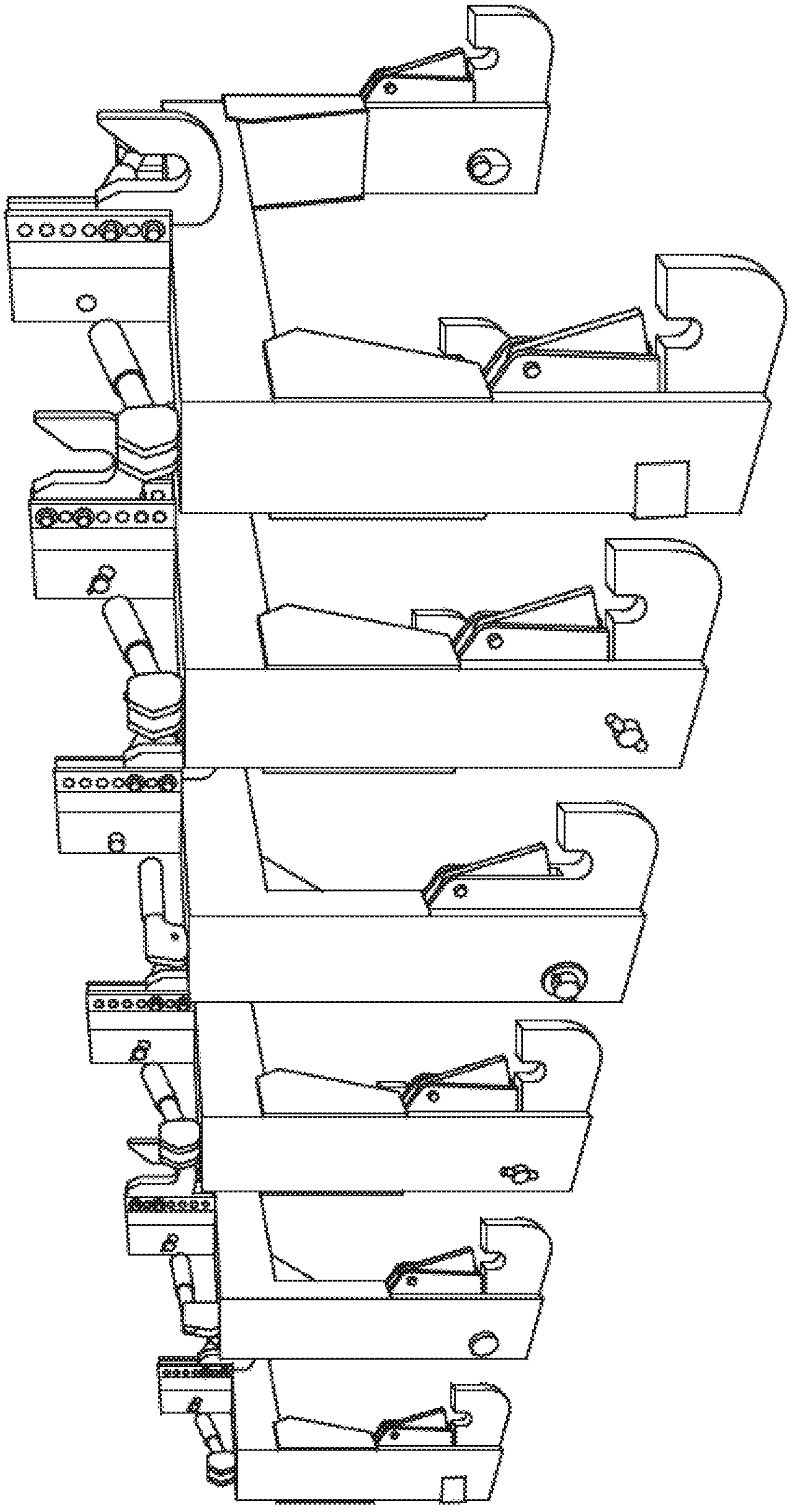
FIG. 2 (PRIOR ART)
FIG. 2 illustrates varying makes/models of quick hitches in accordance with the prior art.
Figure 3:
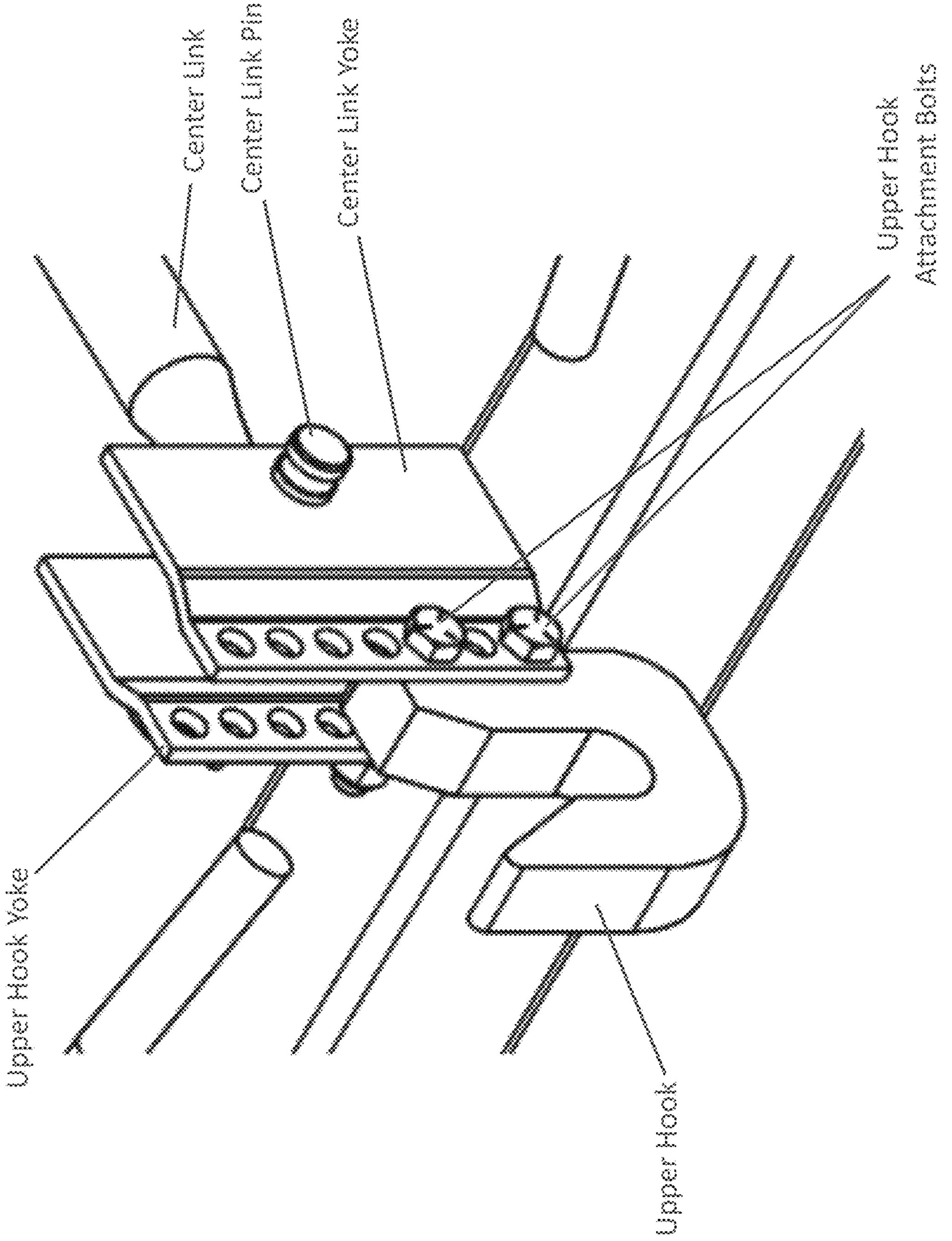
PRIOR ART FIG. 3
FIG. 3 illustrates an adjustable upper hook yoke of a quick hitch in accordance with the prior art.
Figure 4A:
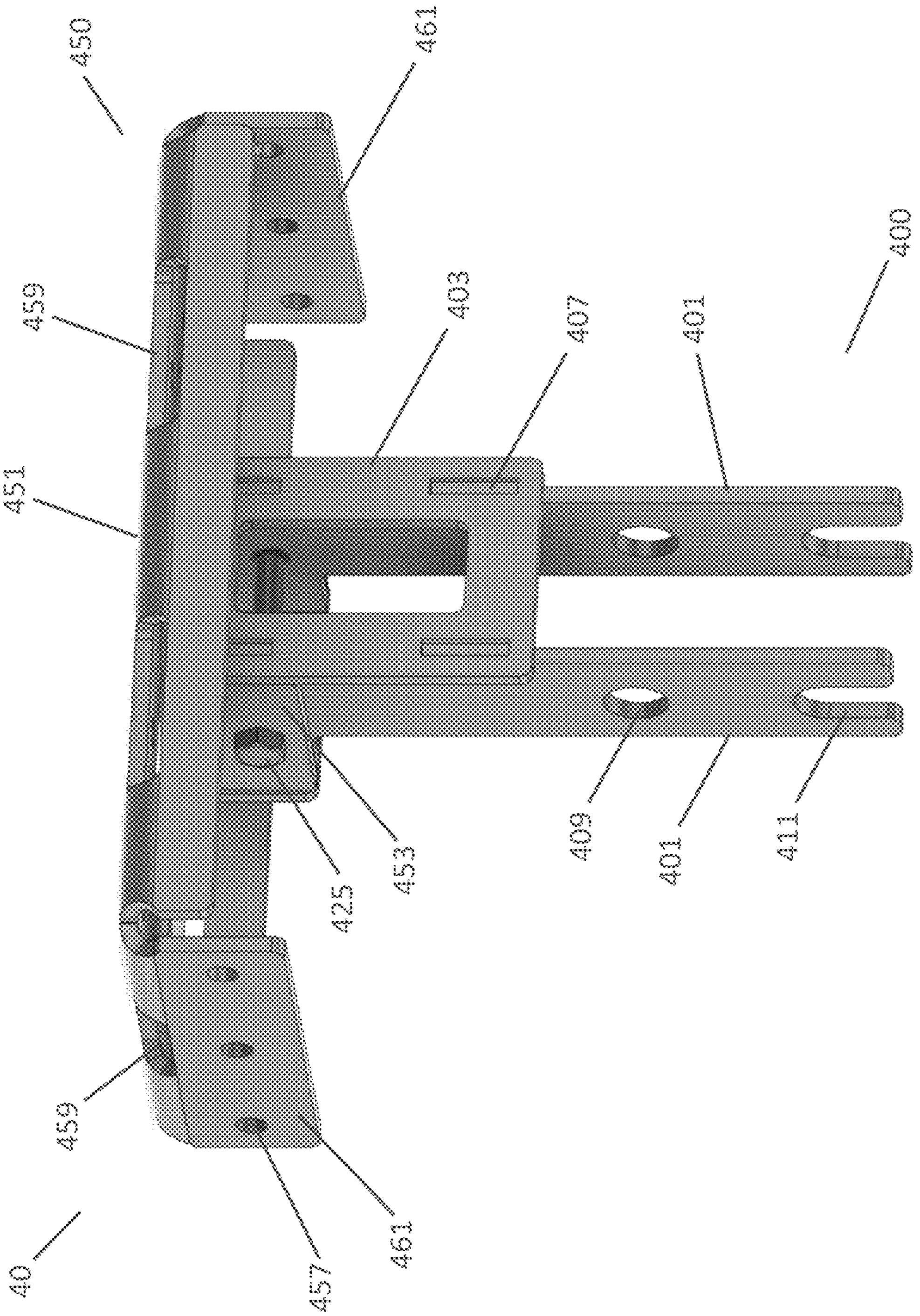
FIG. 4A illustrates a left front perspective of a two-piece universal compact tractor storage system for attachment to an upper hook yoke of a quick hitch, the two-piece universal compact tractor storage system having a baseplate assembled to a mounting bracket via single removable bolt in accordance with various embodiments.
Figure 4B:
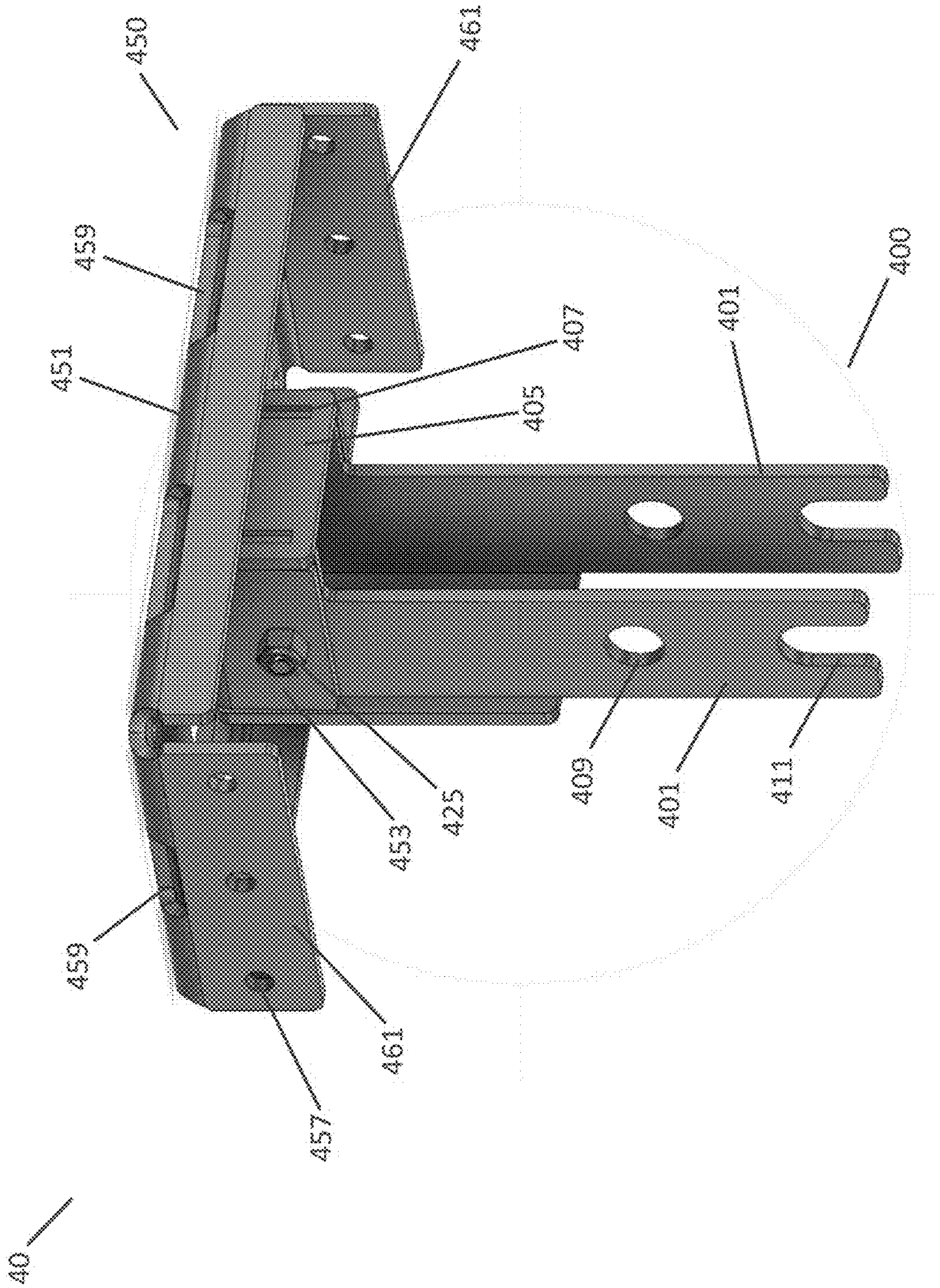
FIG. 4B illustrates a right rear perspective of the two-piece universal compact tractor storage system of FIG. 4A.
Figure 4C:
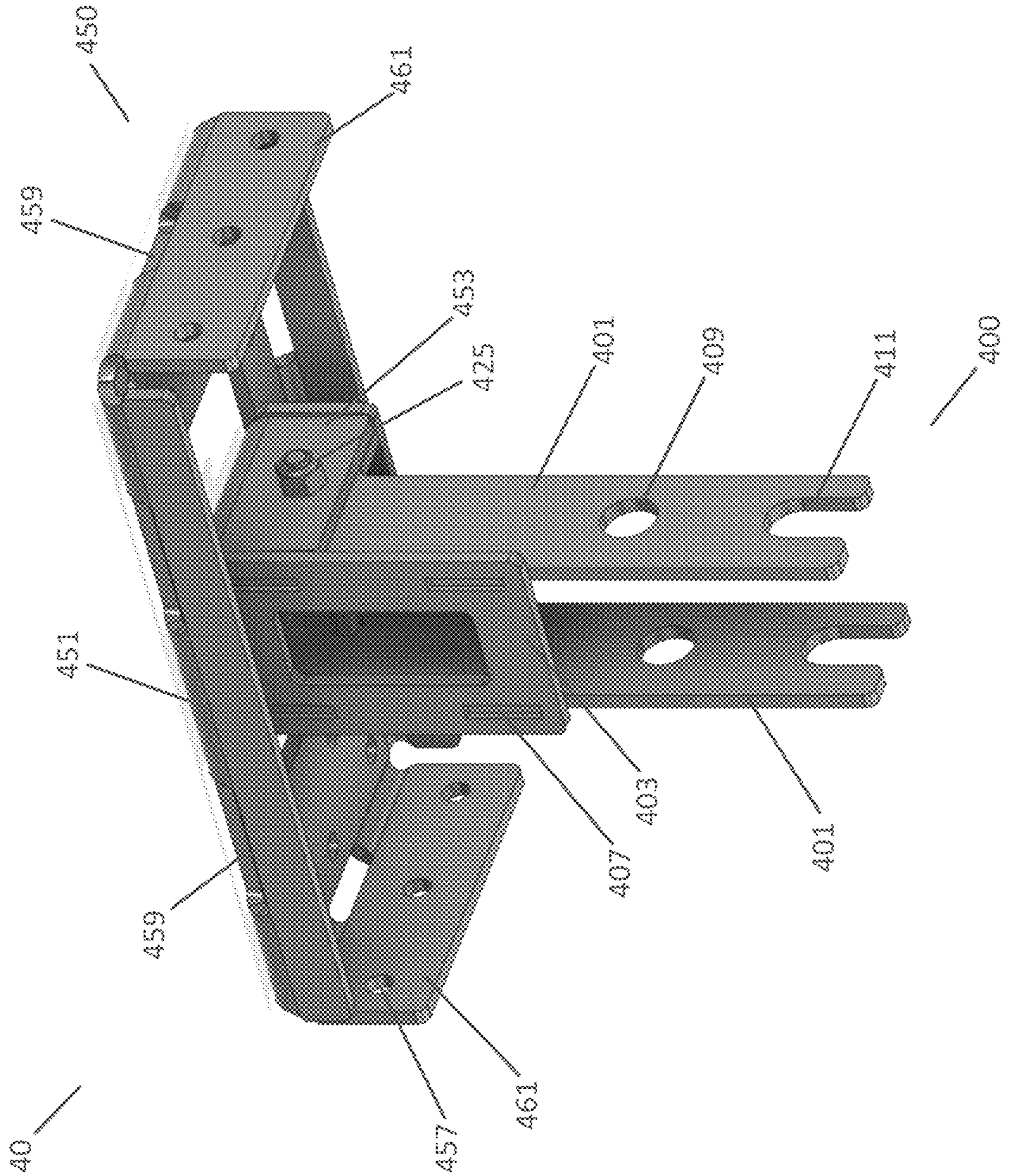
FIG. 4C illustrates a lower right front perspective of the two-piece universal compact tractor storage system of FIG. 4A.
Figure 4D:
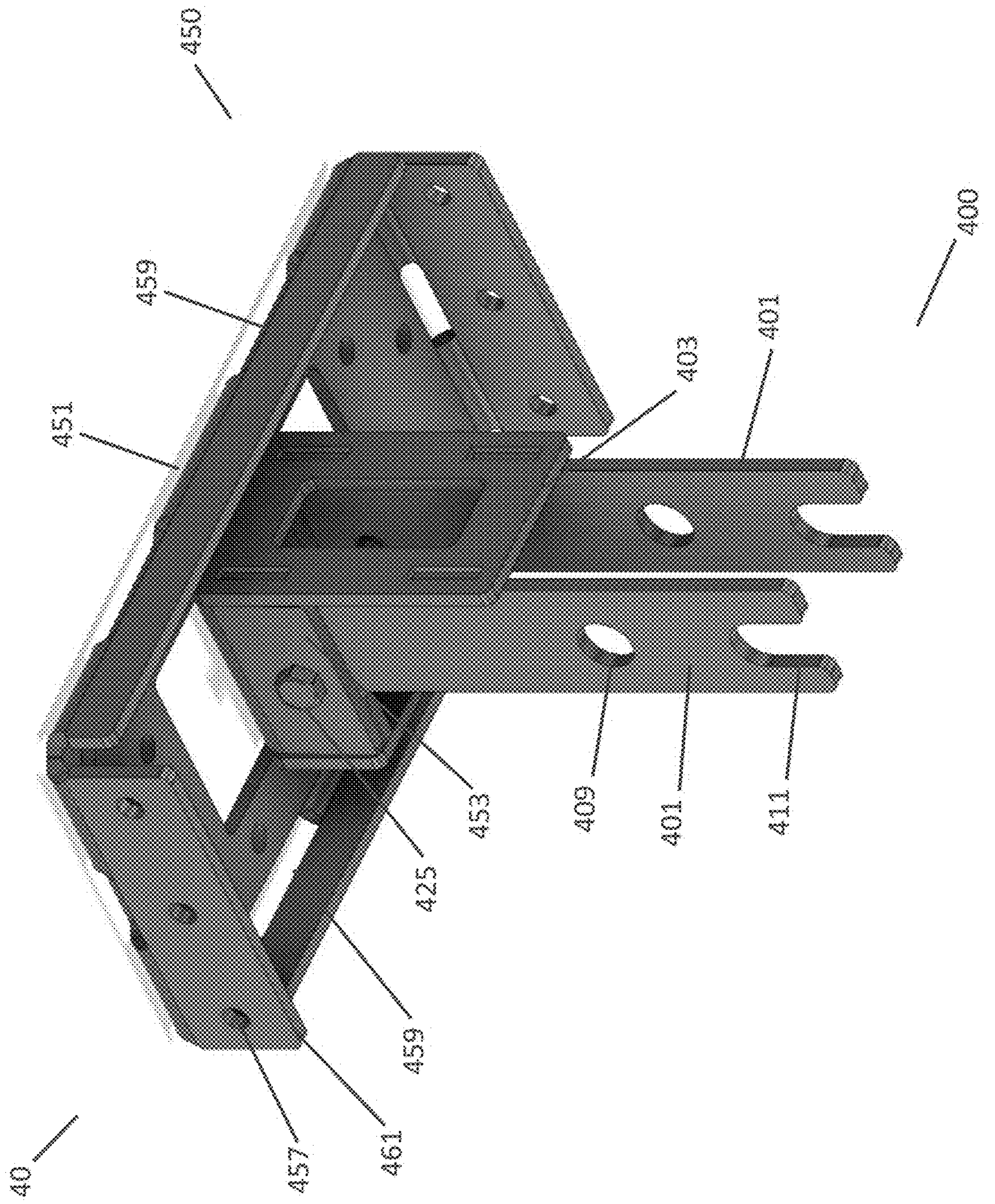
FIG. 4D illustrates a lower left front perspective of the two-piece universal compact tractor storage system of FIG. 4A.
Figure 4E:
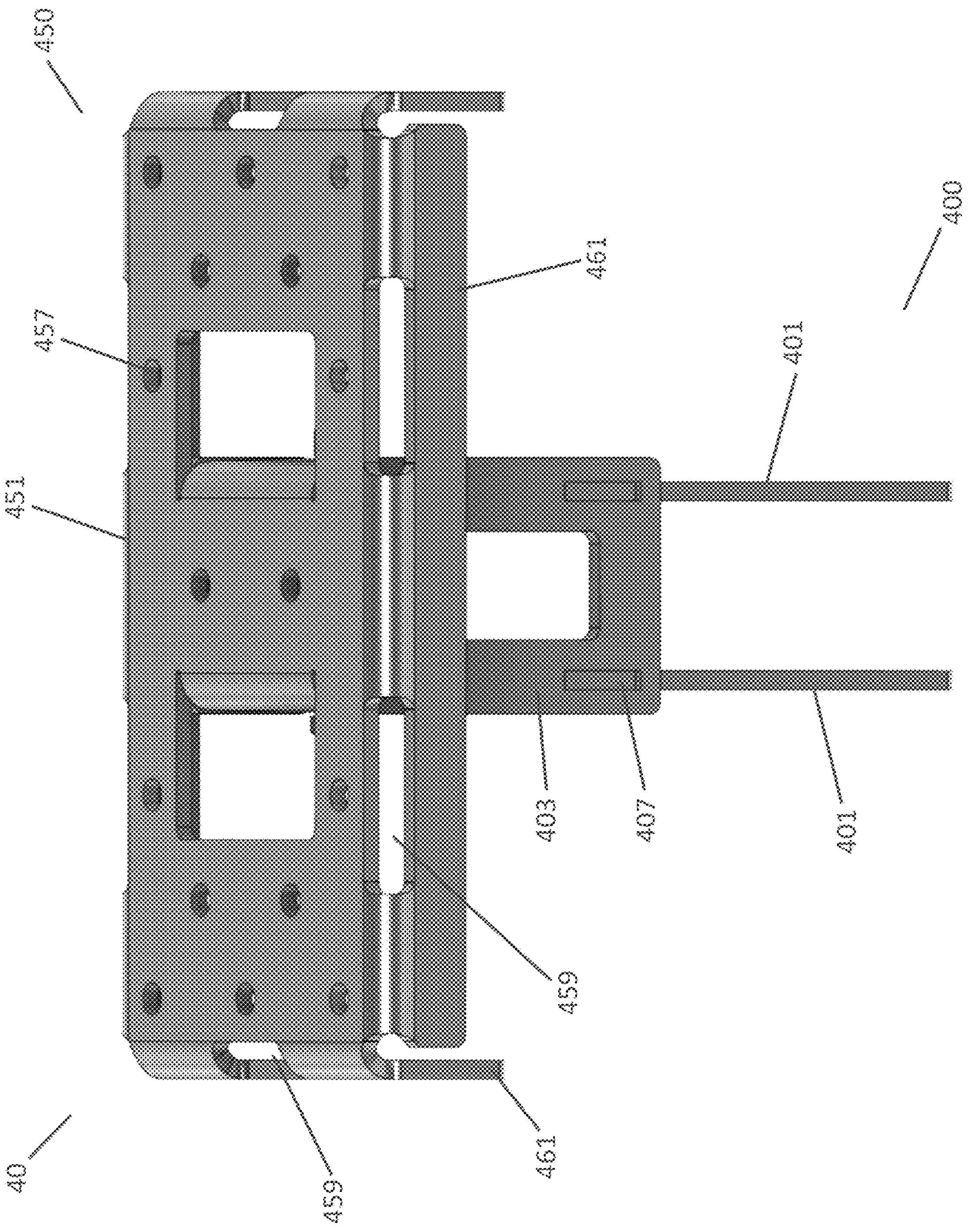
FIG. 4E illustrates an upper front perspective of the two-piece universal compact tractor storage system of FIG. 4A.
Figure 4F:
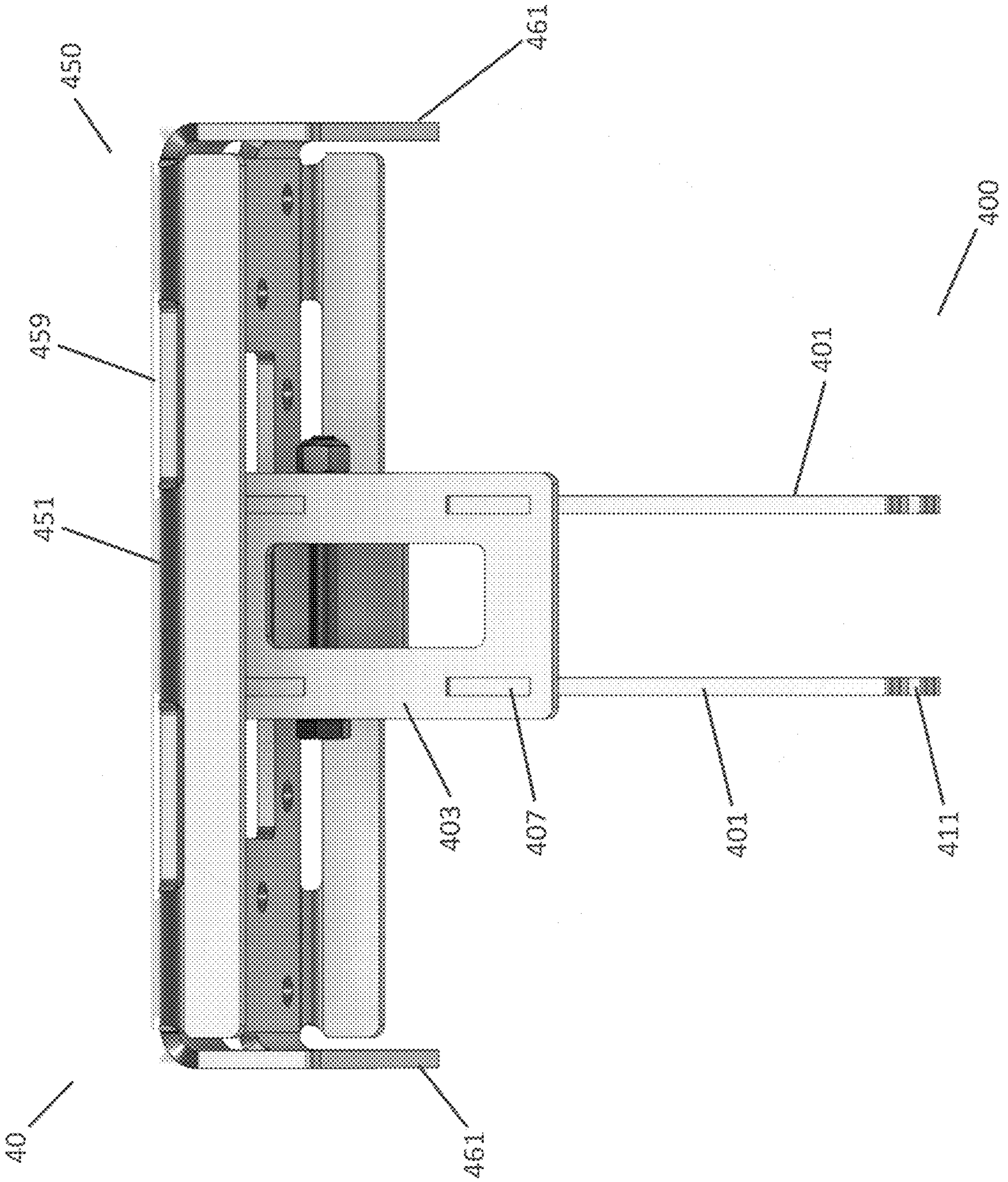
FIG. 4F illustrates a lower front perspective of the two-piece universal compact tractor storage system of FIG. 4A.
Figure 4G:
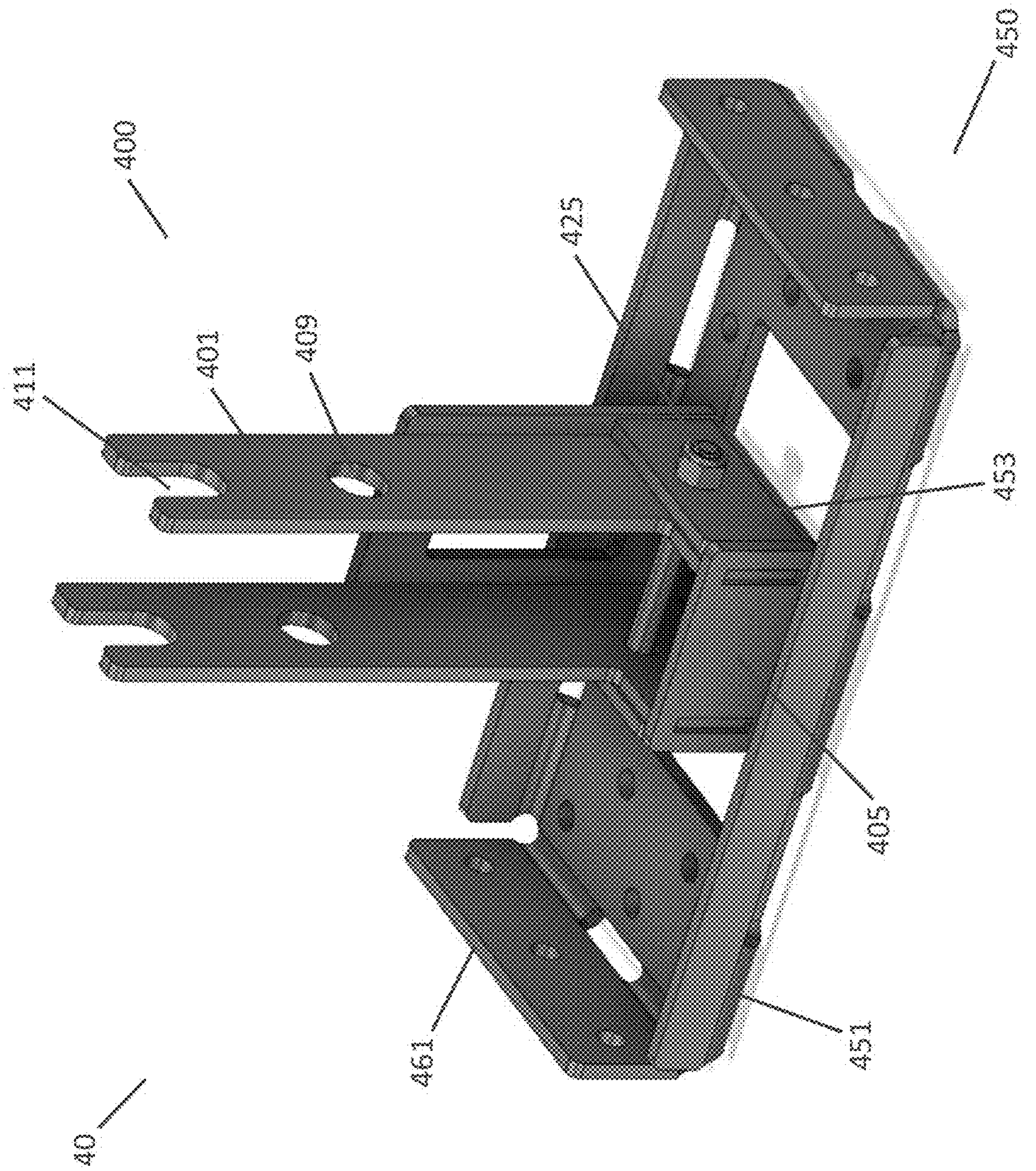
FIG. 4G illustrates a bottom right rear perspective of the two-piece universal compact tractor storage system of FIG. 4A.
Figure 4H:
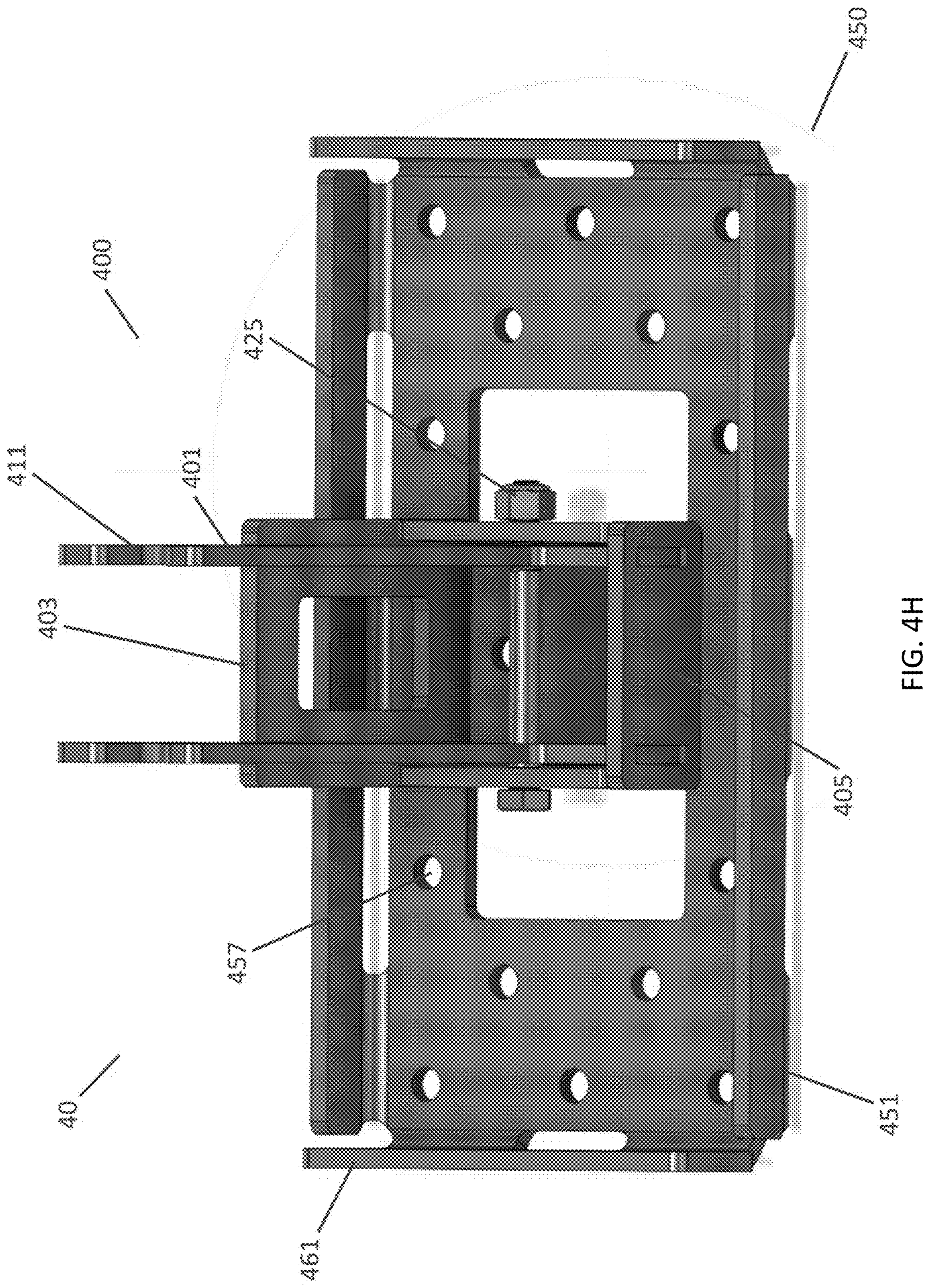
FIG. 4H illustrates a bottom rear perspective of the two-piece universal compact tractor storage system of FIG. 4A.
Figure 4I:
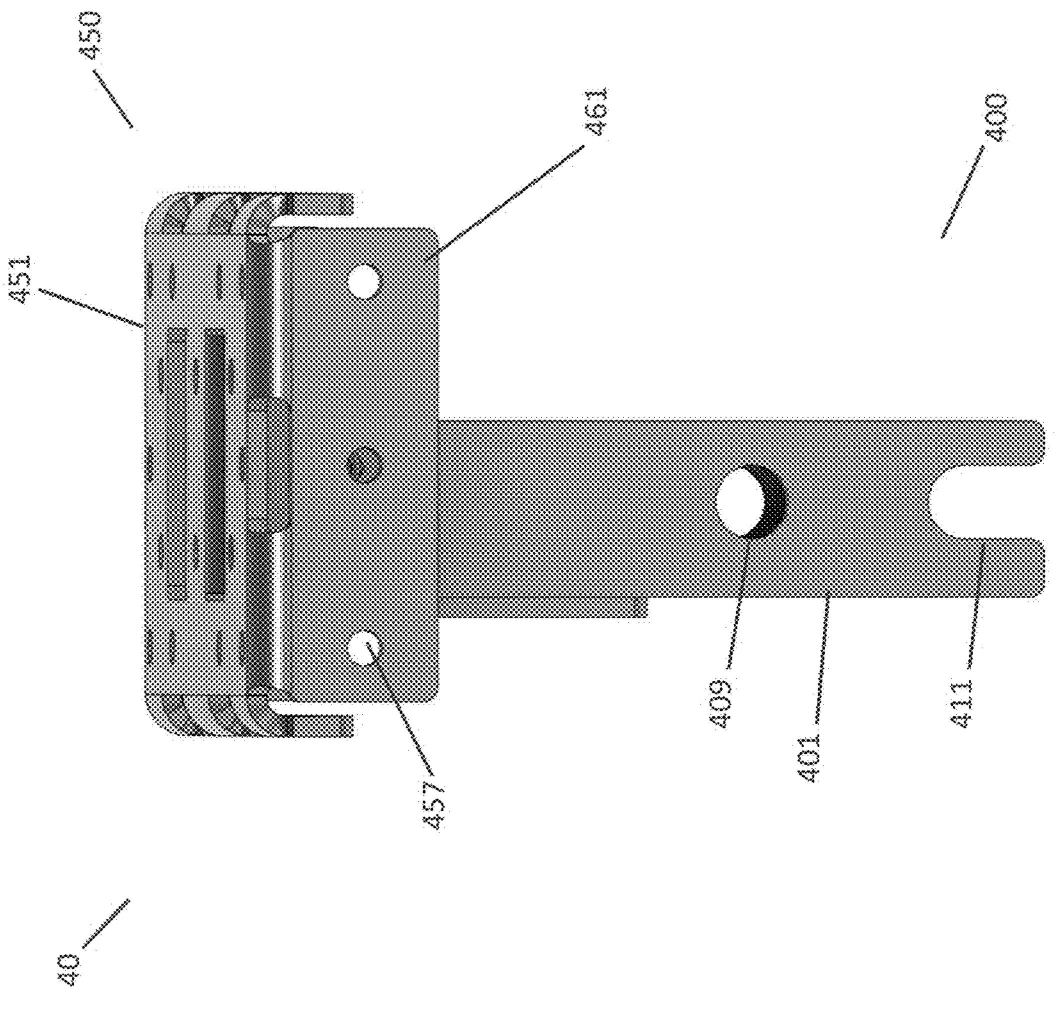
FIG. 4I illustrates an upper right perspective of the two-piece universal compact tractor storage system of FIG. 4A.
Figure 5A:
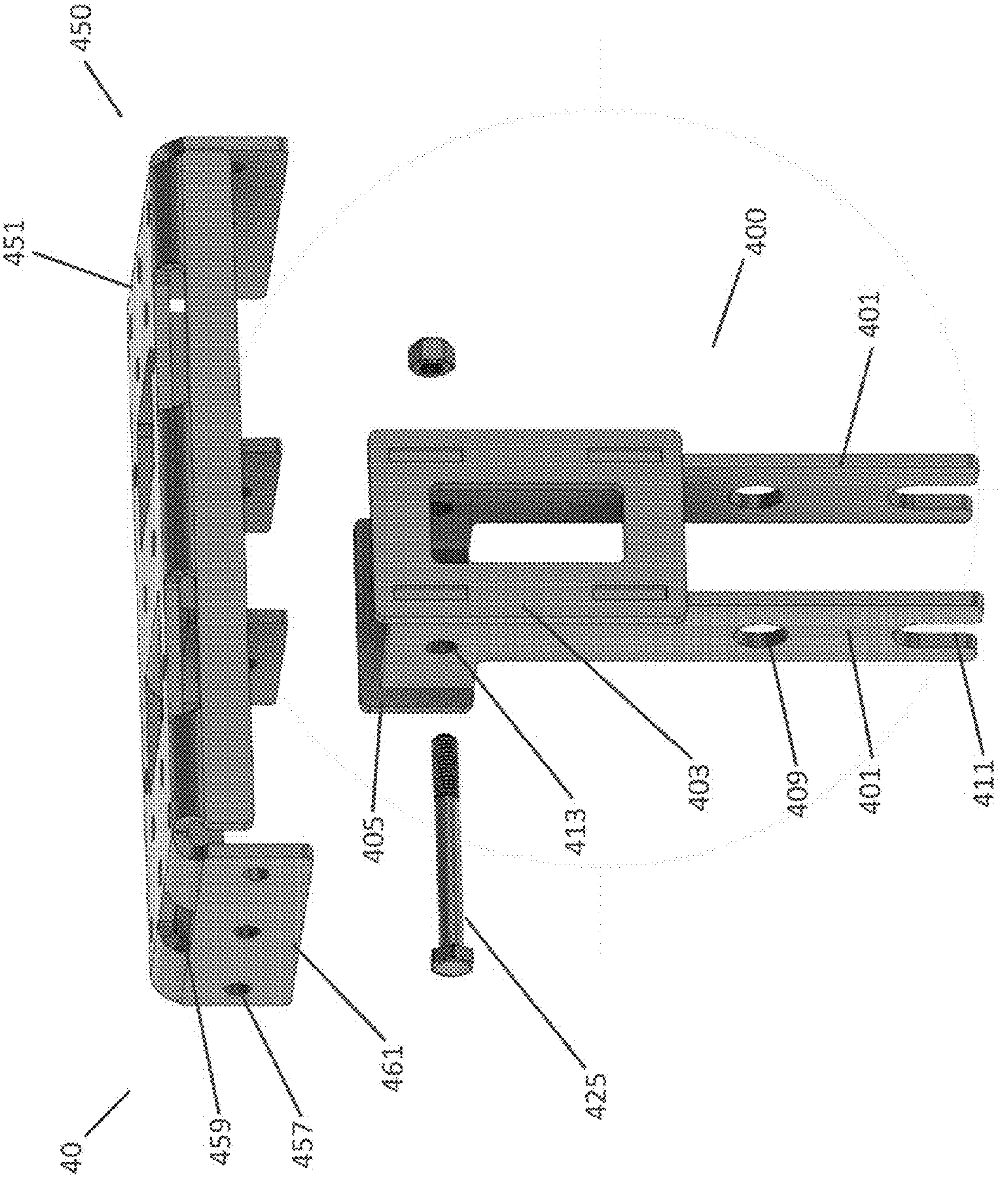
FIG. 5A illustrates a left front perspective of disassembled components of the two-piece universal compact tractor storage system of FIG. 4A.
Figure 5B:
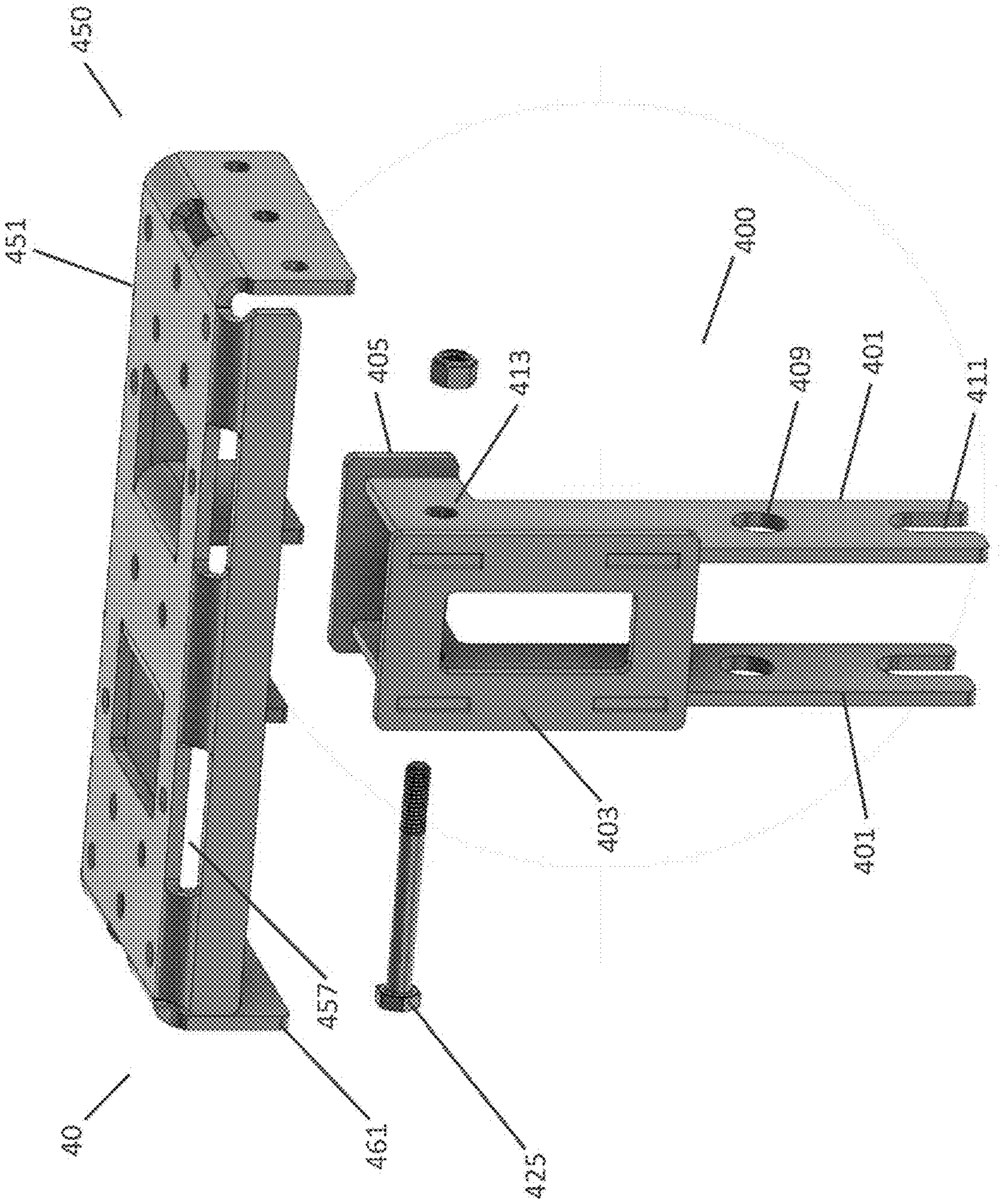
FIG. 5B illustrates a right front perspective of the disassembled components of the two-piece universal compact tractor storage system of FIG. 4A.
Figure 5C:
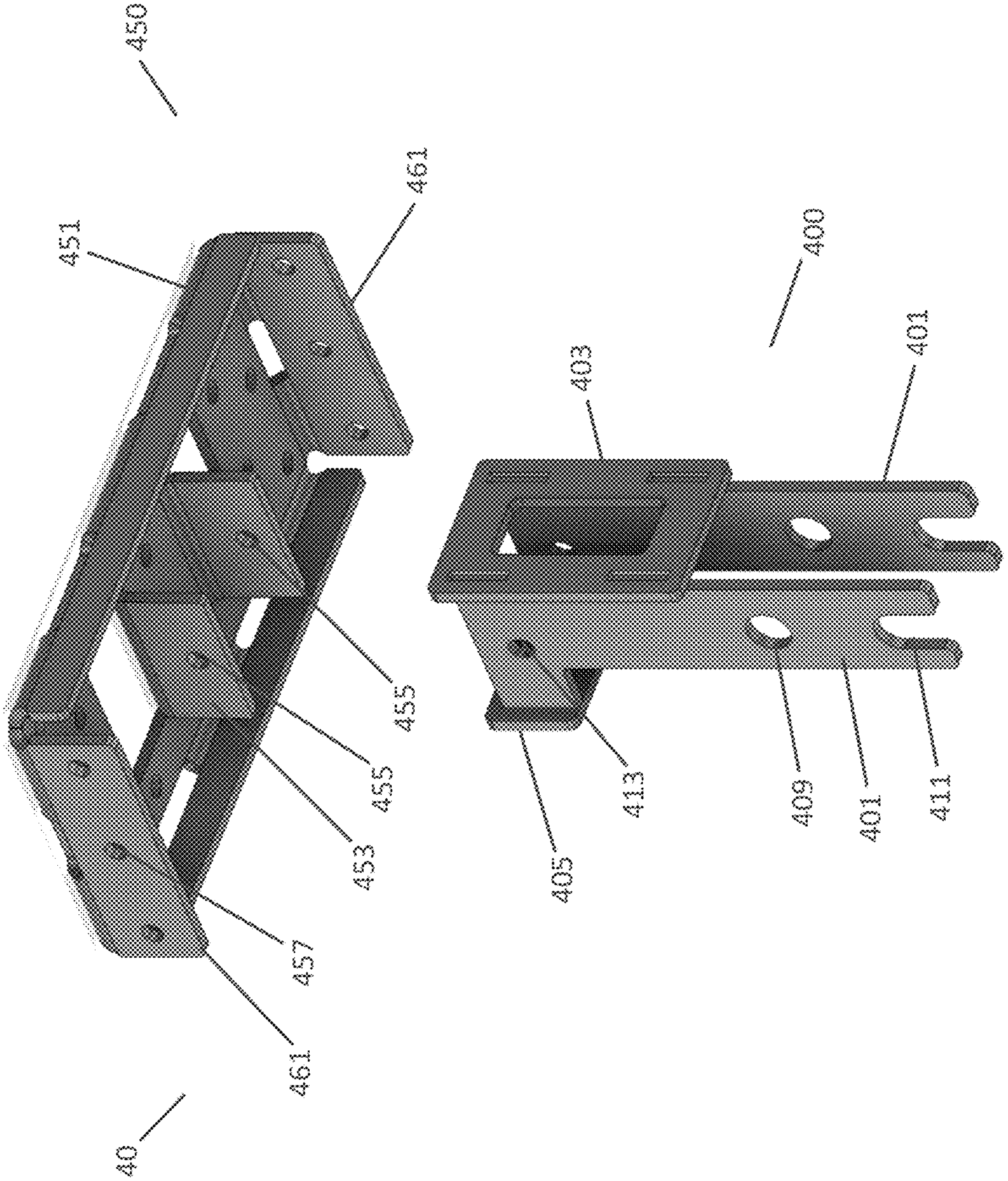
FIG. 5C illustrates a lower front perspective of a disassembled baseplate and mounting bracket of the two-piece universal compact tractor storage system of FIG. 4A.
Figure 6B:
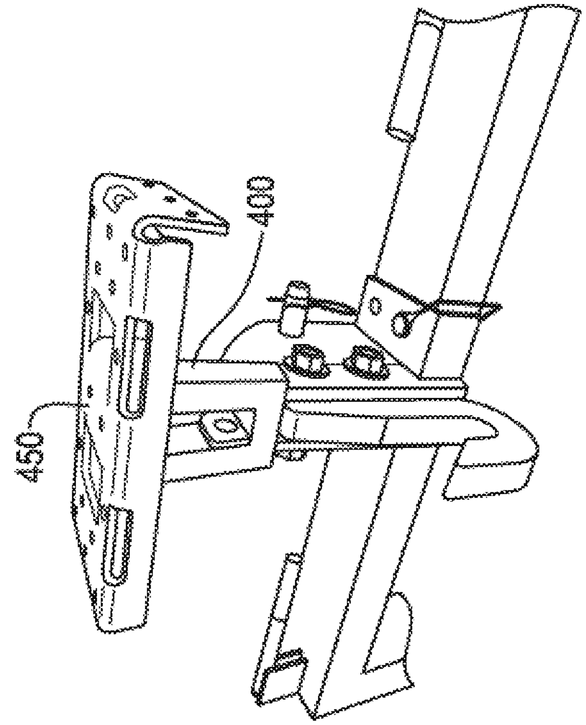
FIGS. 6A-6G illustrate images of various views of the two-piece universal compact tractor storage system of FIG. 4A mounted on a quick hitch of a compact tractor in accordance with various embodiments.
Figure 6A:
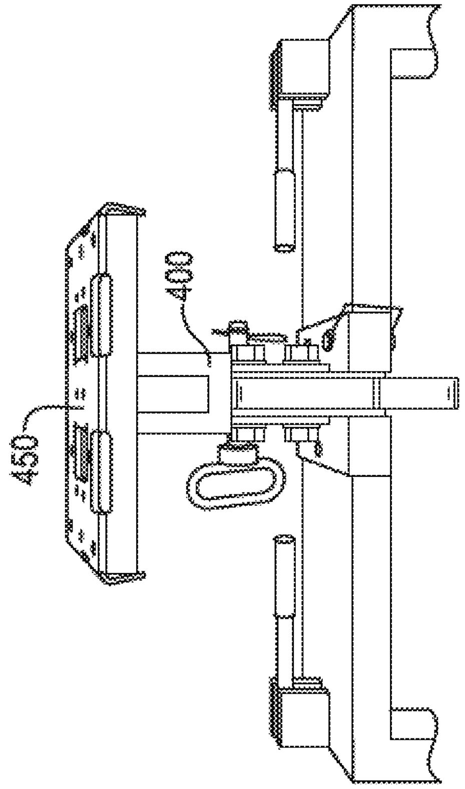
Figure 6D:
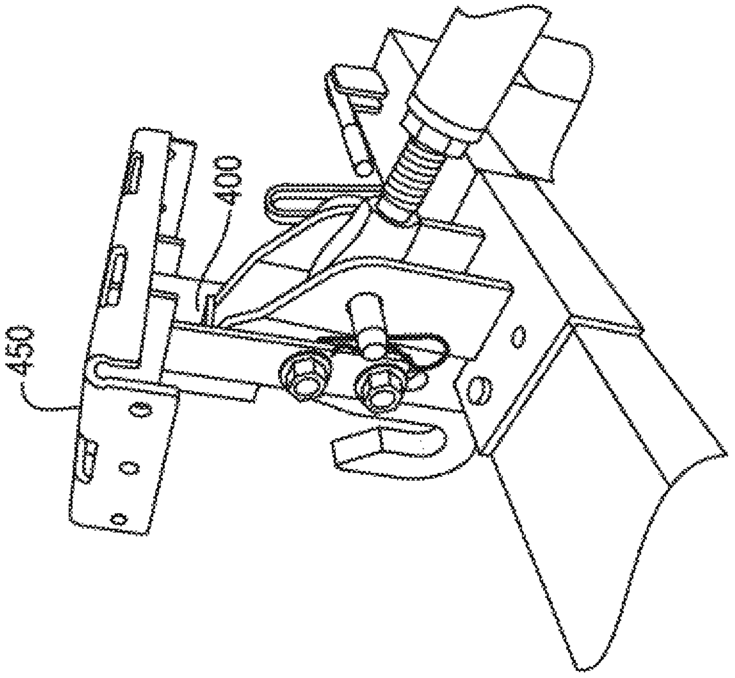
Figure 6C:
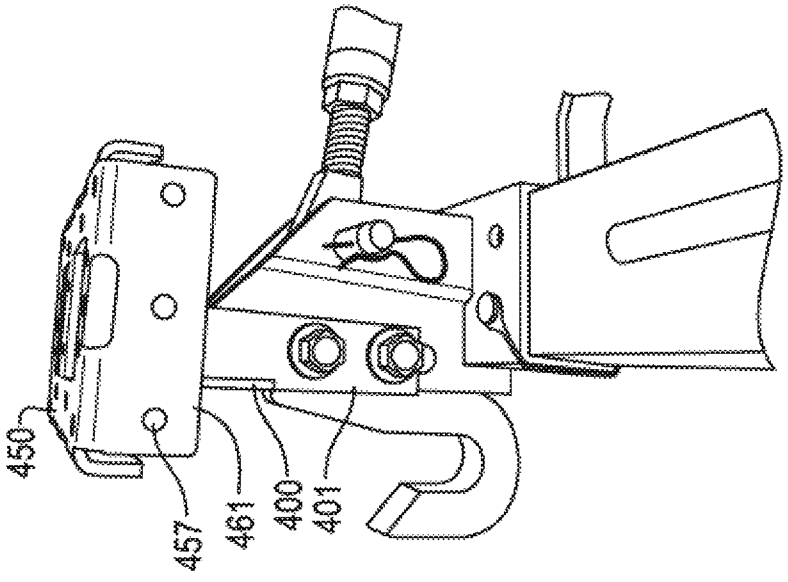
Figure 6F:
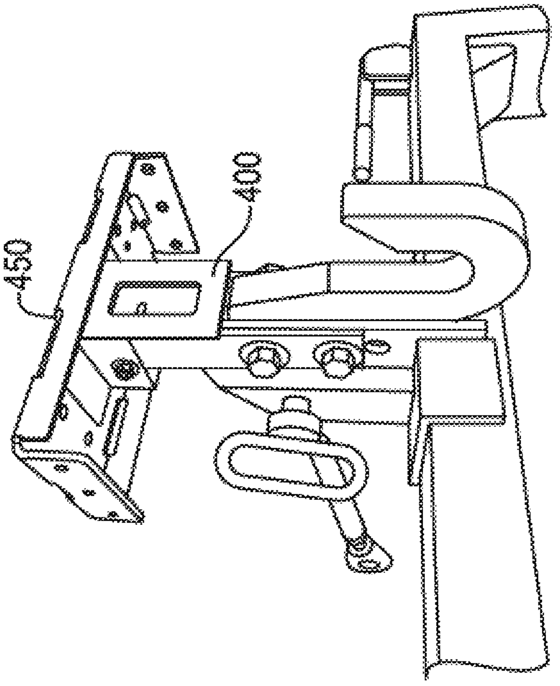
Figure 6E:
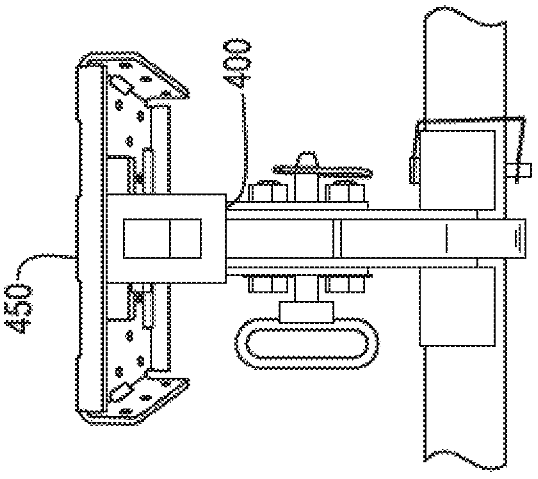
Figure 6G:
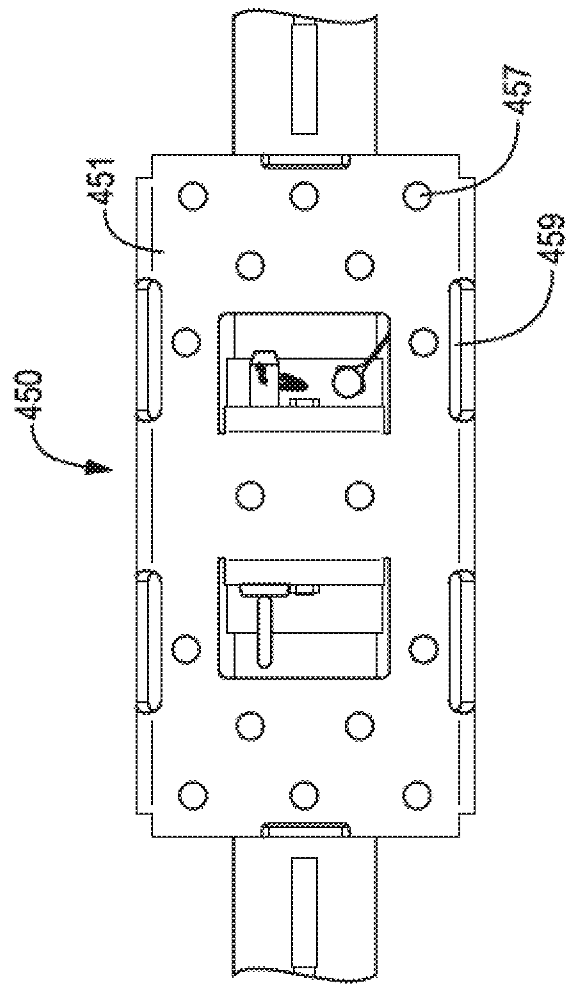

Provided herein are two-piece universal compact tractor storage systems configured to mount onto an upper hook yoke or a center link yoke of a standard 3-point quick hitch having an adjustable upper hook. The storage systems include a mounting bracket sized to be fitted around the upper hook yoke or the center link yoke of the quick hitch and a baseplate removably assemblable to the mounting bracket and configured to receive and support one or more payloads. This design permits a user to fix the mounting bracket of the storage system to the quick hitch and permits simple and quick removal of the baseplate. In use, the storage system can remain attached to the quick hitch without inhibiting the operator from simultaneously attaching, detaching, changing, or using 3-point hitch implements on the same quick hitch.

Upper Hook Yoke Mounting Bracket

A two-piece universal compact tractor storage system 40 configured for mounting to an upper hook yoke of a standard 3-point quick hitch having an adjustable upper hook is shown in FIGS. 4A-4I, 5A-5C, 6A-6G, 7A-7C, and 8. The system 40 includes a mounting bracket 400 for attachment to the upper hook yoke and a baseplate 450 for receiving and supporting one or more payloads.

As best shown in FIGS. 4A-4I, 5A-5C, and 7A-7C, the mounting bracket 400 generally includes parallel vertical mounting supports 401 connected by a front flange 403 and a rear flange 405 to increase rigidity of both the mounting bracket 400 and the assembled baseplate 450 as discussed below.

Figure 7B:
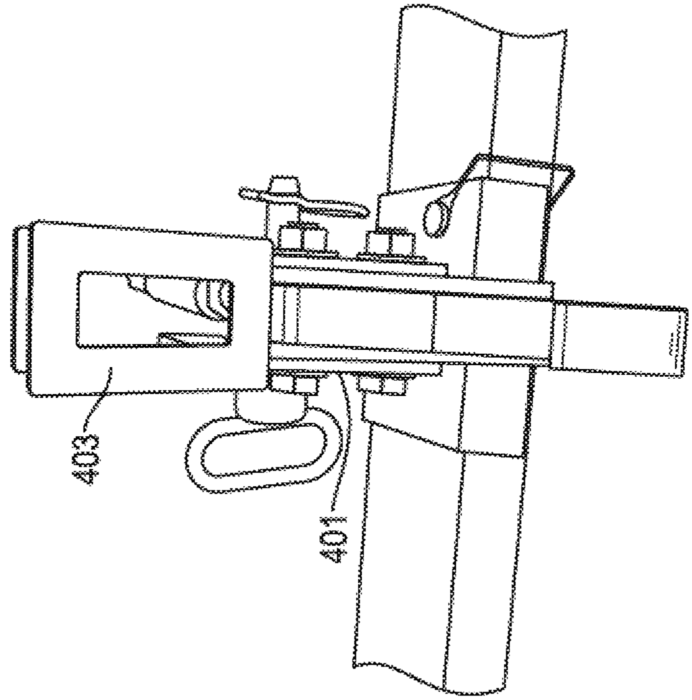
FIGS. 7A-7C illustrate images of a mounting bracket of the two-piece universal compact tractor storage system of FIG. 4A mounted on a quick hitch of a compact tractor in accordance with various embodiments.
Figure 7A:
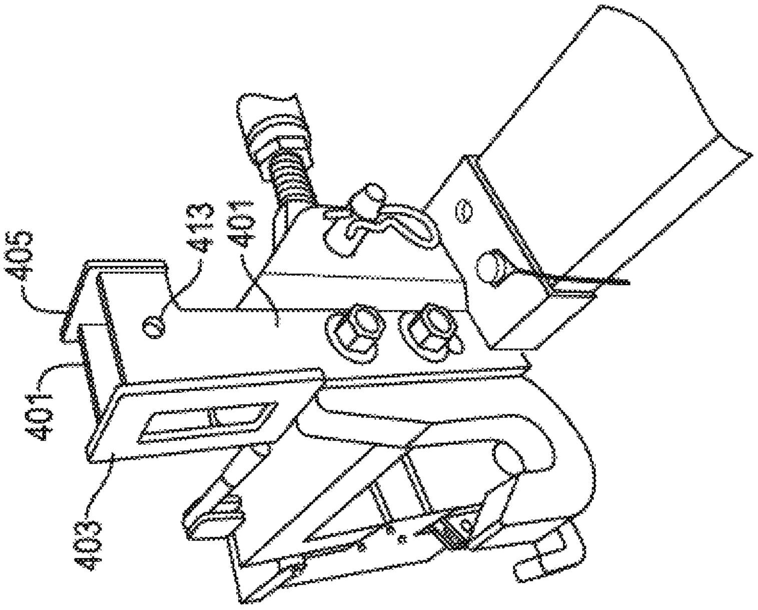
Figure 7C:
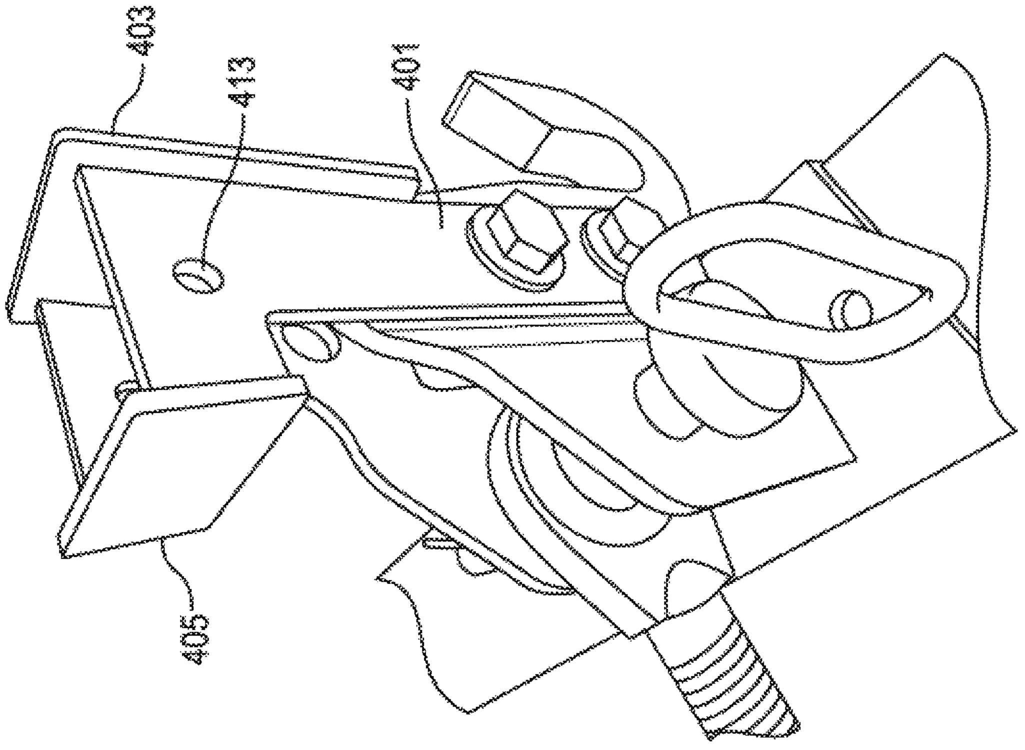

The front and rear flanges 403, 405 can generally be engaged and/or attached to the vertical mounting supports 401 by any suitable means including, for example, welding, brazing, adhesives, mechanical engagement, or combinations thereof. As shown, apertures of the front and rear flanges 403, 405 are mechanically engaged with one or more tabs 407 of the vertical mounting supports 401 (e.g., two tabs 407 for the rear flange 405 as shown, for example, in FIGS. 4G-4H and four tabs 407 for the front flange 403 as shown, for example, in FIGS. 5A-5C). The front and rear flanges 403, 405 can then be secured to the tabs 407 by, for example, welding or brazing. In some embodiments, the welded tabs can be filed, ground, sanded, or otherwise smoothed for a uniform exterior surface of the flanges, which, in turn, can be painted as shown in FIGS. 7A-7C. In addition, although shown herein as including a central hole formed therein, the front flange 403, in some embodiments, can be a solid plate without a central hole (e.g., as shown and described below with reference to FIGS. 9A-12D).

Generally, the vertical mounting supports 401 can be spaced apart such that the mounting bracket is sized to be fitted around the upper hook yoke of the quick hitch, wherein mounting holes 409, 411 of the vertical mounting supports 401 are configured to align with mounting holes of the upper hook yoke itself. In this manner, the same bolts or pins holding the upper hook in place on the quick hitch can be used to fasten the mounting bracket of the universal compact tractor storage system to the yoke of the quick hitch. Accordingly, the mounting holes 409, 411 of the vertical mounting supports 401 can be sized for receiving a quick hitch hook mounting pin or bolt therethrough. In some embodiments a lower one of the mounting holes 411 can form an open slot hole as shown.

Advantageously, providing the lower open slot holes 411 on the mounting bracket permits the mounting bracket to be secured to the yoke without removal of the hook from the quick hitch. Instead, the bolt retaining the hook can simply be loosened, the slot 411 engaged with the bolt, and then the bolt retightened. This thereby eliminates the need to remove the hook when removing or installing the universal compact tractor storage system assembly 40.

In general, because there are currently multiple manufacturers and models of 3-point quick hitches, each storage system may include a mounting bracket 400 having a width, hole size, and/or hole spacing configuration specific to a particular make and model of quick hitch. As such, in some embodiments, the vertical mounting supports 401 are substantially straight and planar (e.g., as shown in FIGS. 4A-4I) and the width of the mounting bracket 400 can be adjusted by increasing or decreasing the spacing therebetween. Unfortunately, such an approach requires the production of quick hitch-specific models having different front and rear flanges 403, 405 as well as different baseplates 450 for mounting thereto. To avoid the need for fully customized front and rear flanges 403, 405 and to maintain baseplate 450 interchangeability between all models, in some embodiments, the width of an upper portion of the mounting bracket 400 (and the spacing between the vertical mounting supports 401) can be consistent throughout all models and a quick hitch-specific width can be achieved by shaping the vertical mounting supports 401 to symmetrically bend outward or inward to match the required width (e.g., as shown and described in connection with FIGS. 9A-12D below).

The vertical mounting supports 401 also include baseplate 450 assembly holes 413 in an upper portion thereof for receiving a baseplate 450 assembly bolt 425 or pin therethrough as described in further detail below.

Referring now to FIGS. 4A-4I, 5A-5C, and 6A-6G, the baseplate 450 can include a payload support plate 451 and two assembly tabs 453. The two assembly tabs 453 can extend downward from the payload support plate 451 and be spaced apart such that the assembly tabs 453 of the baseplate 450 are sized to be fitted against the vertical mounting supports 401 of the mounting bracket such that bracket assembly holes 455 of each tab are configured to align with the baseplate assembly holes 413 of each vertical mounting support 401. In this manner, the baseplate can be fixed to the mounting bracket 400 with a single through assembly bolt 425 or pin to allow rigid coupling of the two pieces, while still providing for quick and easy removal of the baseplate 450 from the mounting bracket 400. In general, use of an assembly pin for assembly of the baseplate 450 to the mounting bracket 400 offers the quickest release in the event a user plans to remove the baseplate 450 to transport a payload away from the tractor or change payload. By contrast, use of an assembly bolt 425 for assembly of the baseplate 450 to the mounting bracket 400 offers a more stable fit that is resistant to movement and rattling during operation of the tractor, while still providing for relatively quick and easy removal. In addition, the assembly tabs 453 can each have a width sized to be fitted between the front and rear flanges 403, 405 to prevent tipping of the baseplate 450 relative to the mounting bracket 400 via rotation about the assembly pin or bolt 425.

The payload support plate 401 can include a multitude of pre-drilled holes 457 and/or slots 459 for accommodating and/or securing nearly any payload, including, for example, a storage compartment, a box, or any other object that will meet the needs of the user and fit on the tractor. Such payload can be attached to the baseplate 450 using the provided holes 457, slots 459, and/or any other feature of the baseplate 450, by any suitable means, including, for example, by being bolted, strapped, adhered, or otherwise attached or secured to the baseplate 450. In some embodiments, the payload support plate 451 can include one or more sides 461. In some embodiments, two or more such sides 461 can be longer than the assembly tabs 453 in order to permit the payload support plate 451 to be set on a horizontal surface, with payload attached, without tipping over or needing to balance on the assembly tabs 453. Such vertical sides 461 may each include one or more holes 457 and/or slots 459 formed therein to provide additional options for payload securement.

Figure 8:
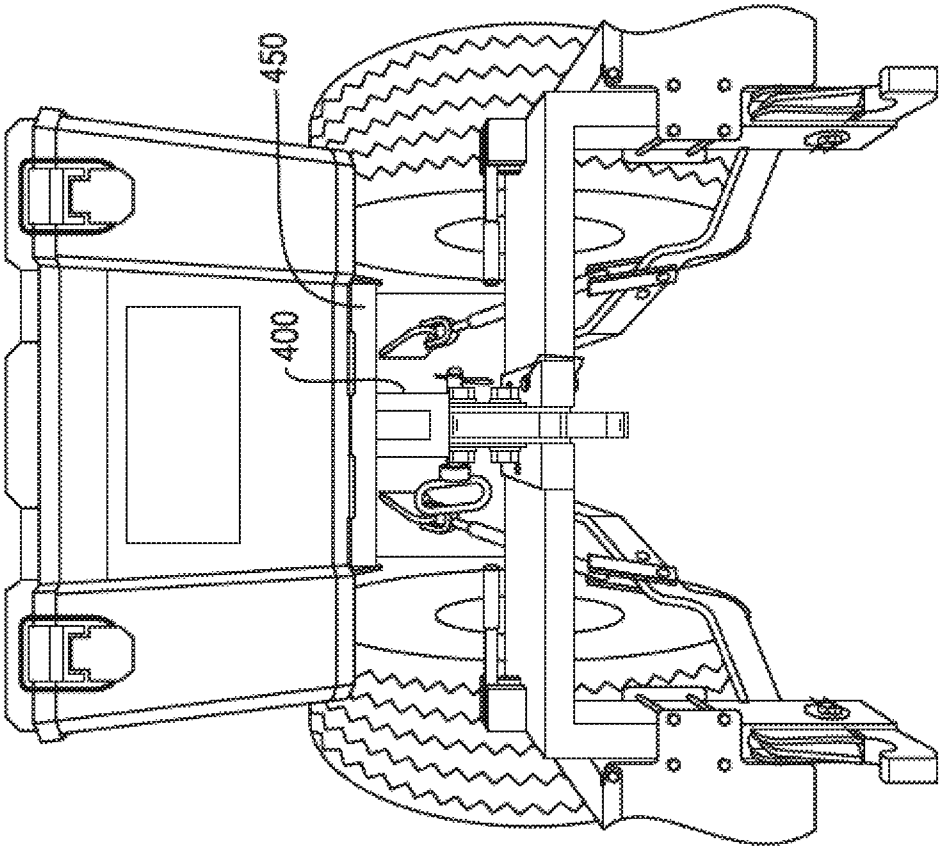
FIG. 8 illustrates an image of a toolbox payload attached to the two-piece universal compact tractor storage system of FIG. 4A as mounted on a quick hitch of a compact tractor in accordance with various embodiments.

The payload can generally be anything the user would like that fits the user's needs and falls within the size and space limitations of the tractor and the weight-bearing limits of the storage system. Because the storage system 40 is configured to be universal rather than requiring a specific standard payload, there are limitless possibilities for user configuration. Payloads can include anything from a milk crate to a toolbox to an ammo can, fuel tanks or cans, a pail or bucket, a tool rack, a tray, tools, gloves, shackles, rigging, hydration bottles, chainsaws, personal protective equipment, phones, radios, bug spray, fire extinguishers, food, or any other object the user wishes to transport or carry on the tractor. For example, as shown in FIG. 8, a job box has been mounted to a universal compact tractor storage system 40, which is mounted to a quick hitch of a compact tractor.

In addition, because the baseplate 450 is removable from the mounting bracket 400, the user can advantageously have a variety of payloads, each attached to a separate baseplate 450. In this manner, when swapping payloads, instead of laboriously removing a first payload and then attaching a second, the user can quickly and easily remove a current baseplate 450 carrying the first payload and attach another base plate 450 carrying the second payload. During such a swap the mounting bracket 400 can remain attached to the quick hitch. In this manner, using a single mounting bracket 400, the user can have a customized, rapidly interchangeable set of payloads for storage and/or object transport.

Accordingly, in some applications, the universal compact tractor storage system 40 including both the mounting bracket 400 and one or more baseplates 450 can be provided as a kit. In other applications, each component of the storage system 40 may be available separately, thereby increasing versatility.

Center Link Yoke Mounting Bracket

A two-piece universal compact tractor storage system 90 configured for mounting to a center link yoke of a standard 3-point quick hitch having an adjustable upper hook is shown in FIGS. 9A-9D, 10A-10D, 11A-11B, and 12A-12D. The system 90 includes a mounting bracket 900 for attachment to the center link yoke and a baseplate 950 for receiving and supporting one or more payloads.

As best shown in FIGS. 9A-9D, 10A-10D, and 12A-12D, the mounting bracket 900 generally includes parallel vertical mounting supports 901 connected by a front flange 903 and a rear flange 905 to increase rigidity of both the mounting bracket 900 and the assembled baseplate 950 as discussed below.

Figure 9A:
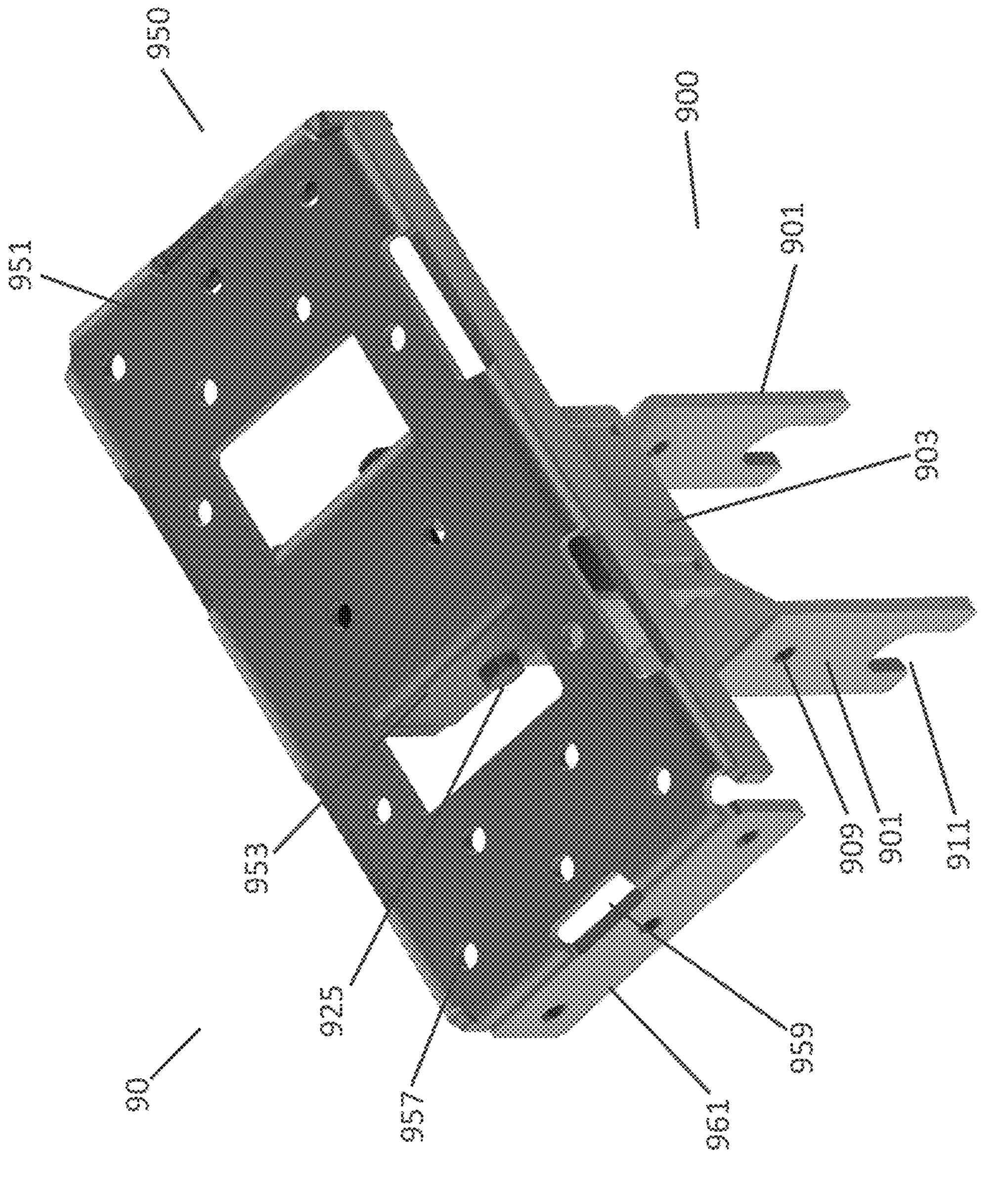
FIG. 9A illustrates a top left front perspective of an alternative two-piece universal compact tractor storage system for attachment to a center link yoke of a quick hitch, the alternative two-piece universal compact tractor storage system having a baseplate assembled to a mounting bracket via single removable bolt in accordance with various embodiments.
Figure 9B:
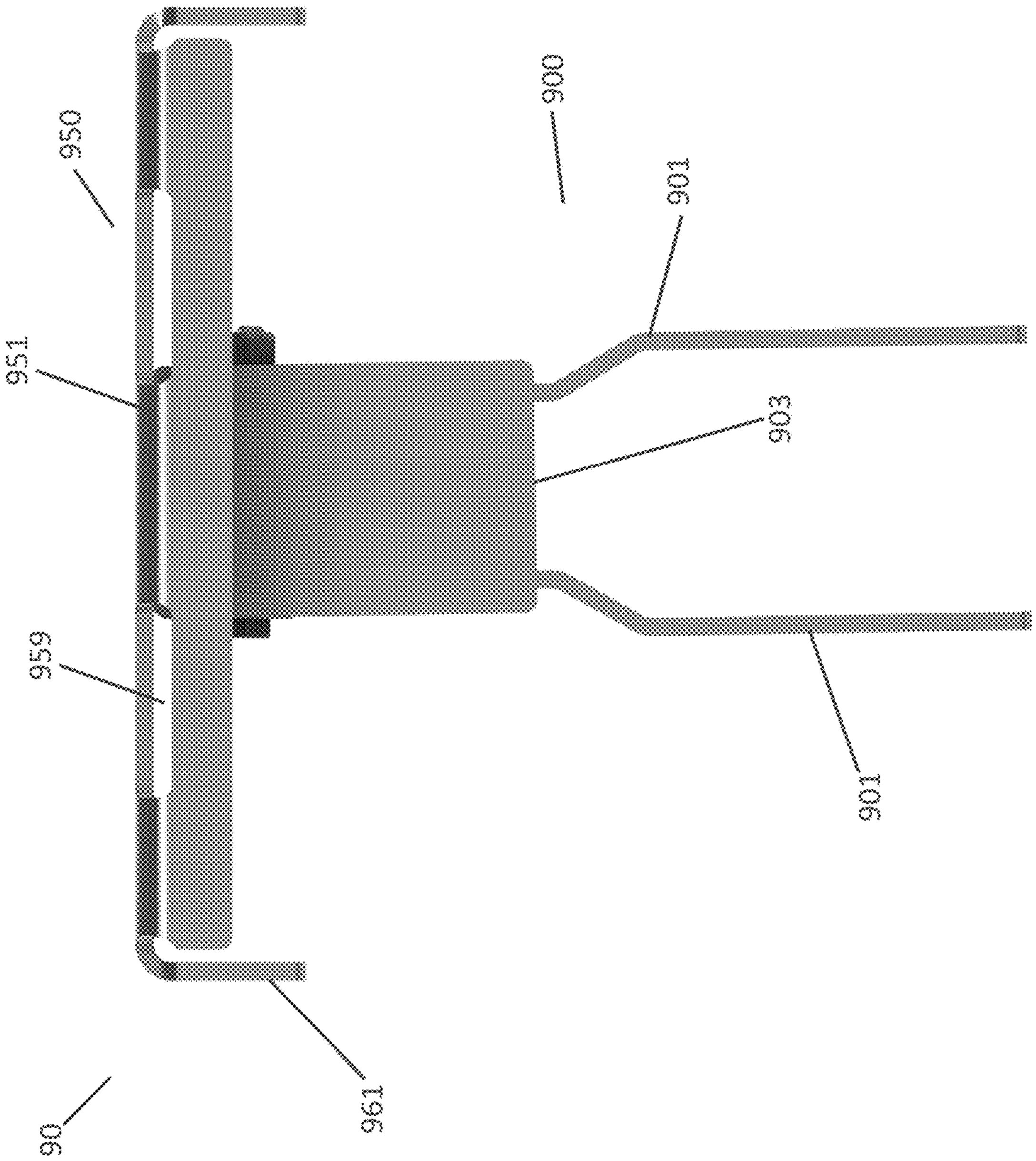
FIG. 9B illustrates a front view of the alternative two-piece universal compact tractor storage system of FIG. 9A.
Figure 9C:
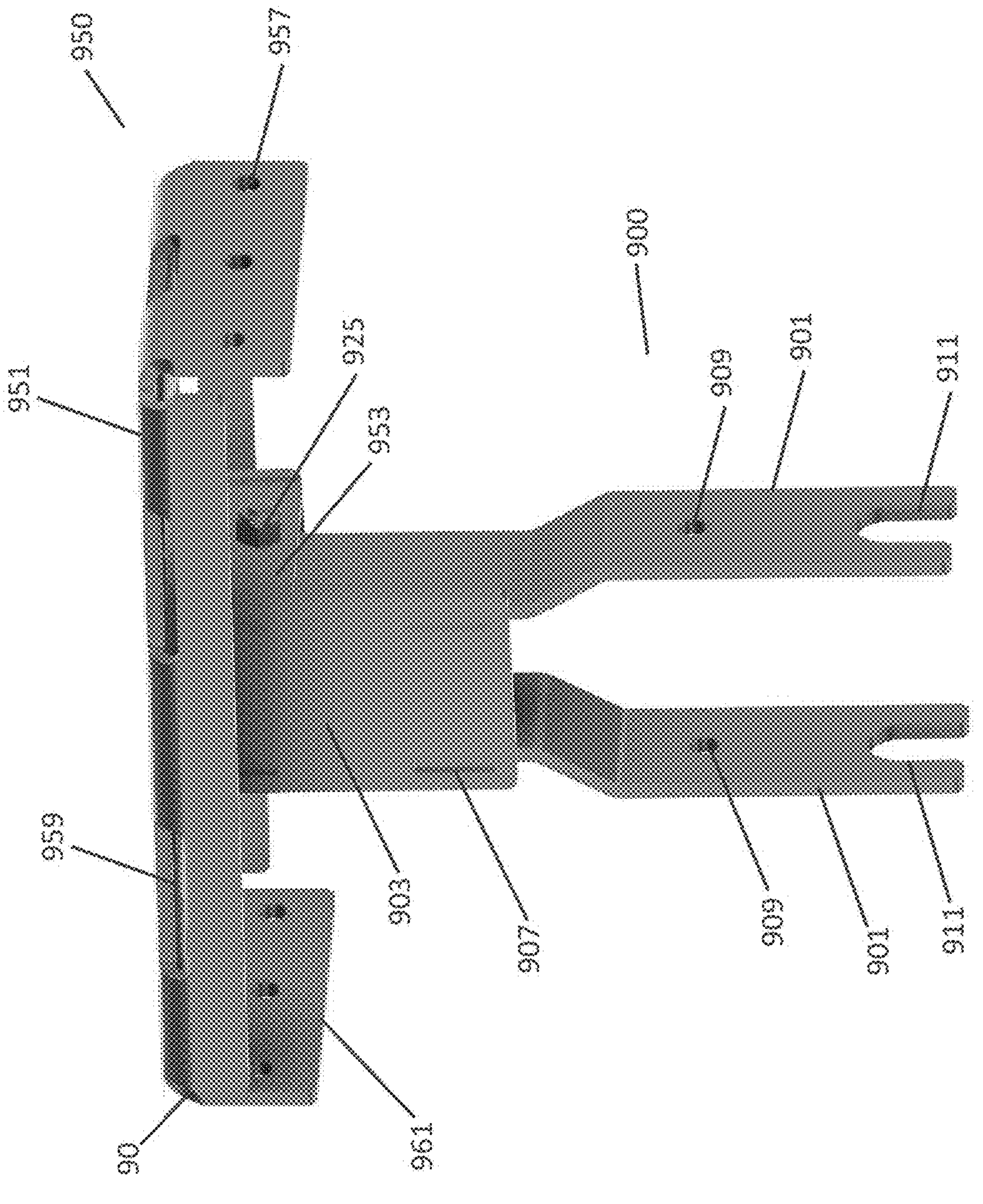
FIG. 9C illustrates a right front perspective of the alternative two-piece universal compact tractor storage system of FIG. 9A.
Figure 9D:
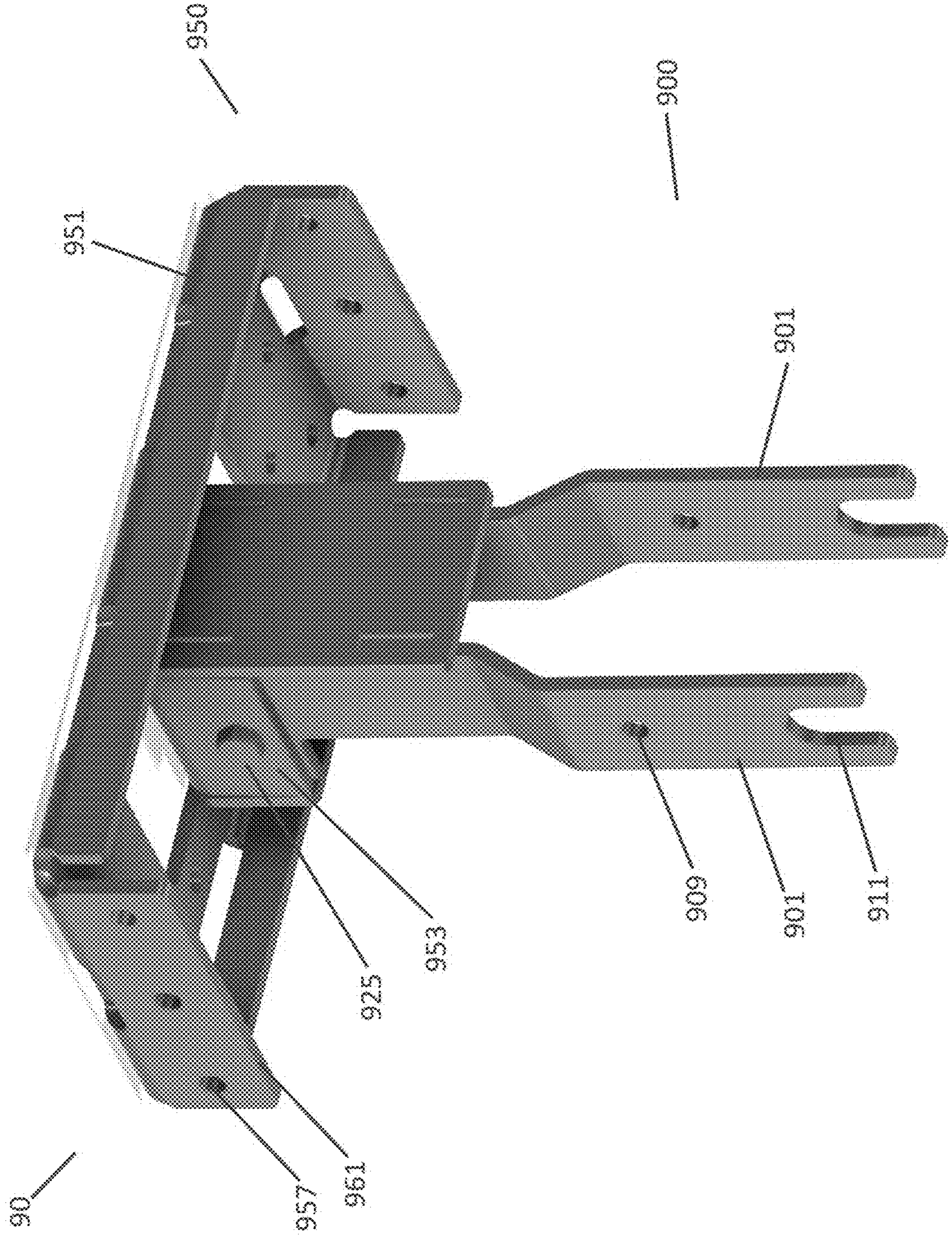
FIG. 9D illustrates a lower left front perspective of the alternative two-piece universal compact tractor storage system of FIG. 9A.
Figure 10A:
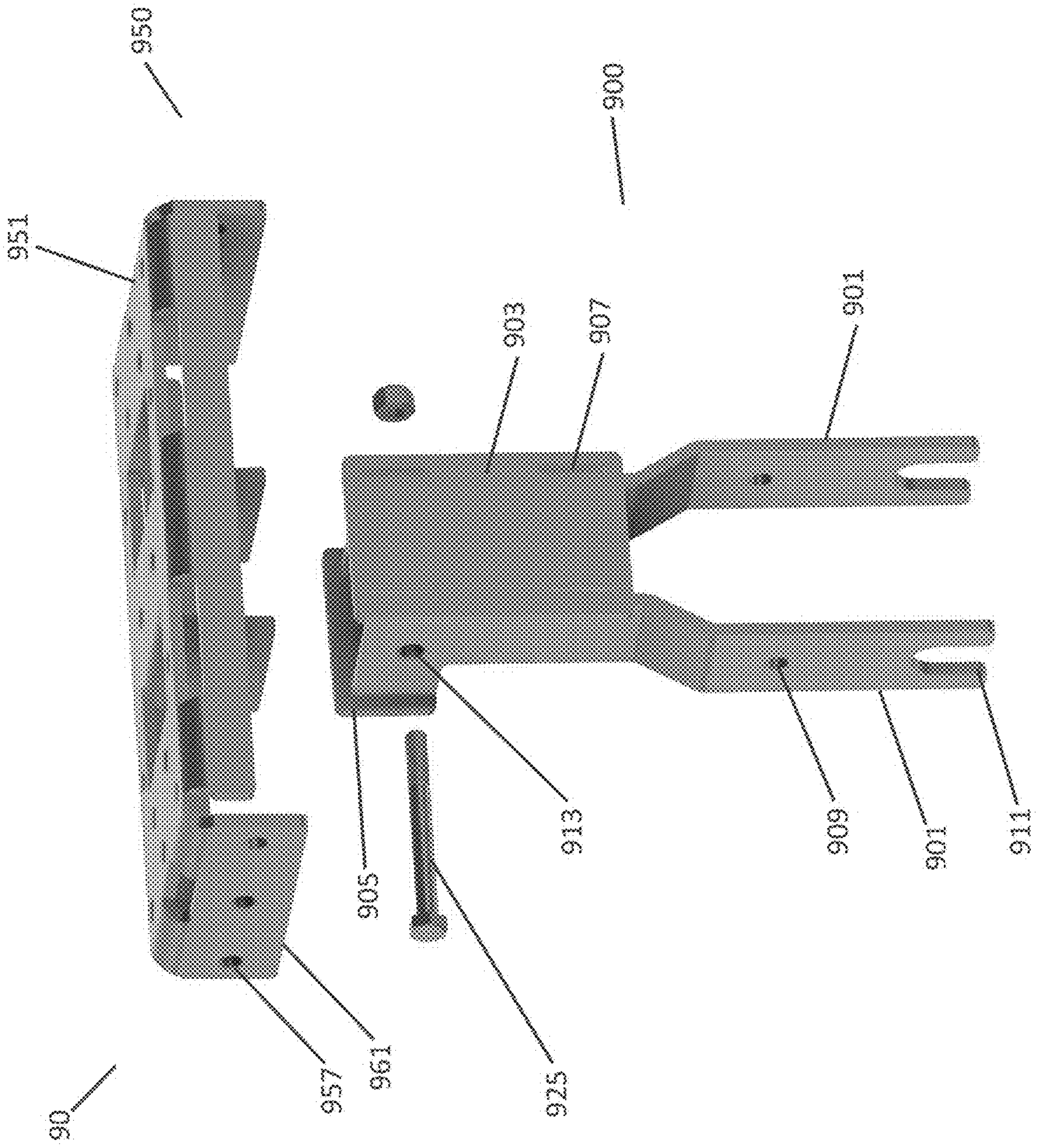
FIG. 10A illustrates a left front perspective of disassembled components of the alternative two-piece universal compact tractor storage system of FIG. 9A.
Figure 10B:
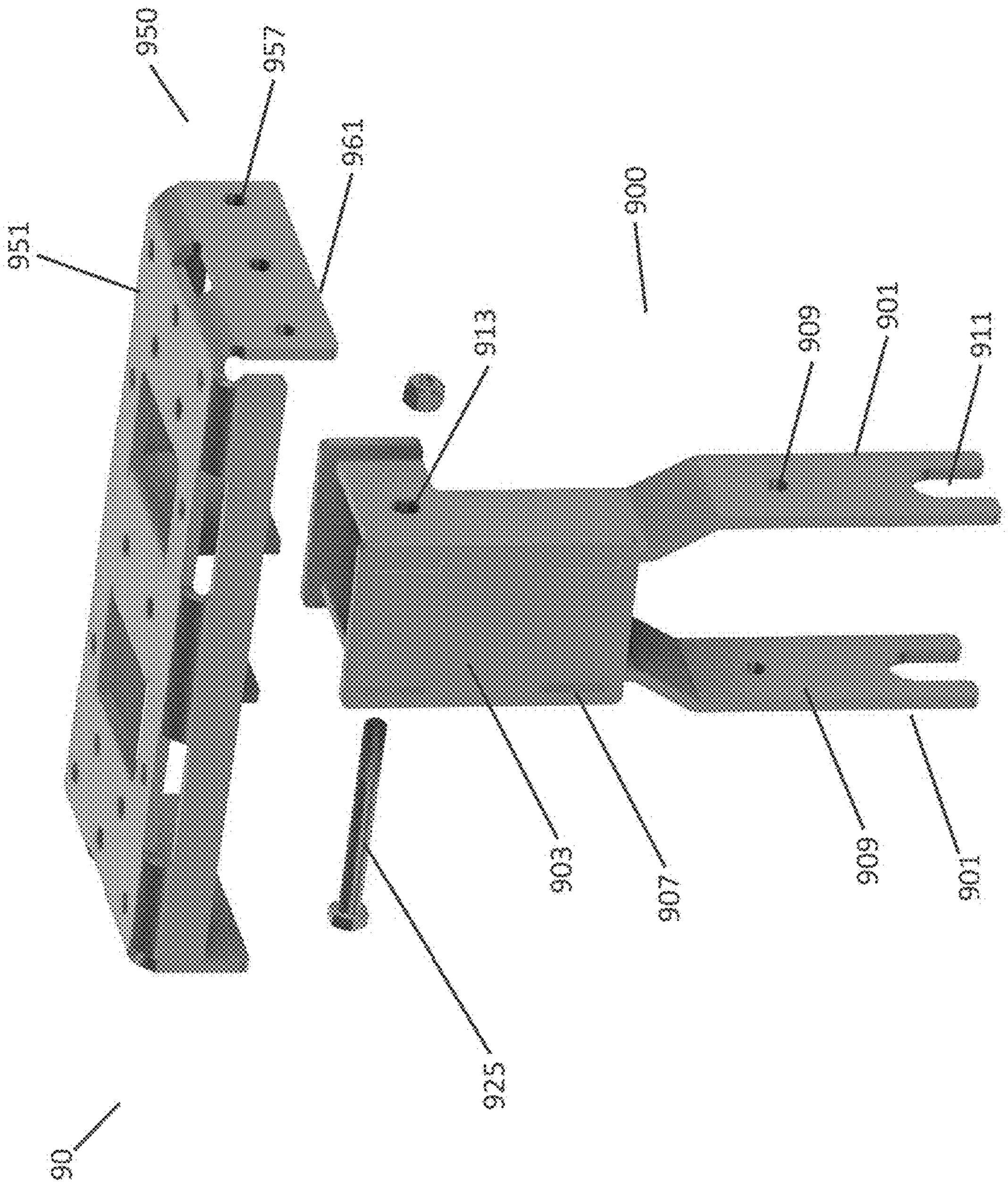
FIG. 10B illustrates a right front perspective of the disassembled components of the alternative two-piece universal compact tractor storage system of FIG. 9A.
Figure 10C:
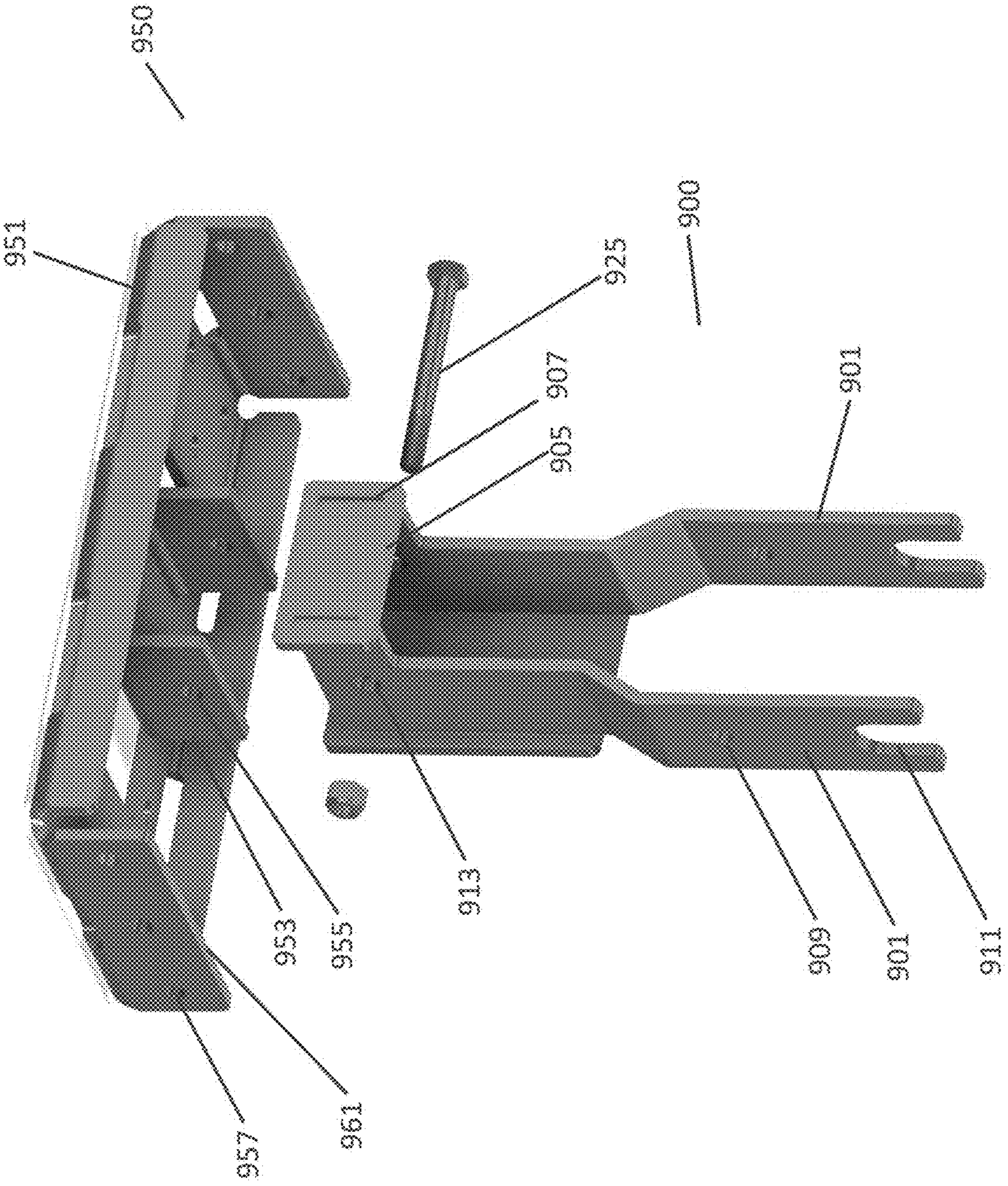
FIG. 10C illustrates a lower right rear perspective of the disassembled components of the alternative two-piece universal compact tractor storage system of FIG. 9A.
Figure 10D:
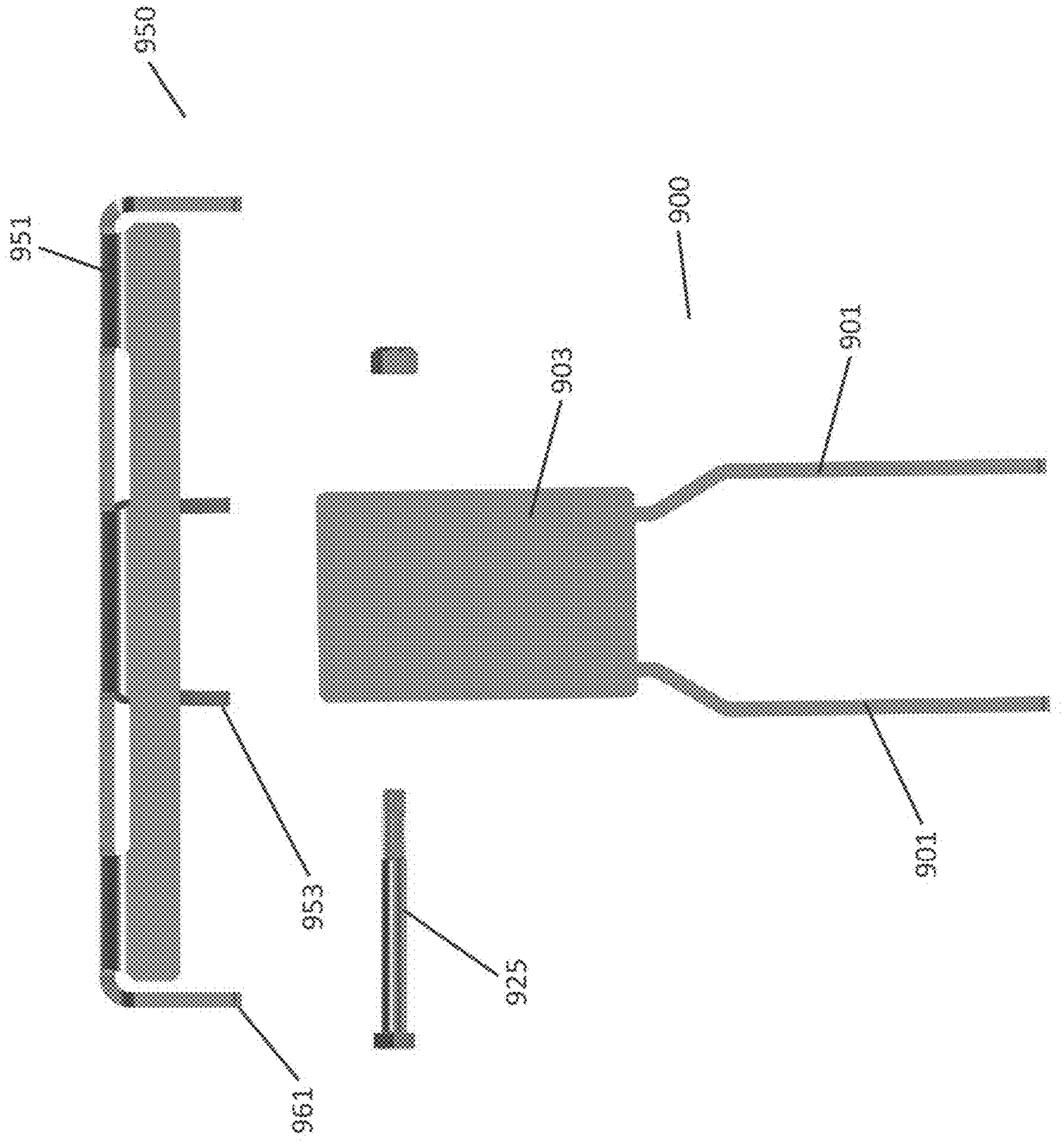
FIG. 10D illustrates a front perspective of a disassembled baseplate and mounting bracket of the alternative two-piece universal compact tractor storage system of FIG. 9A.
Figure 11A:
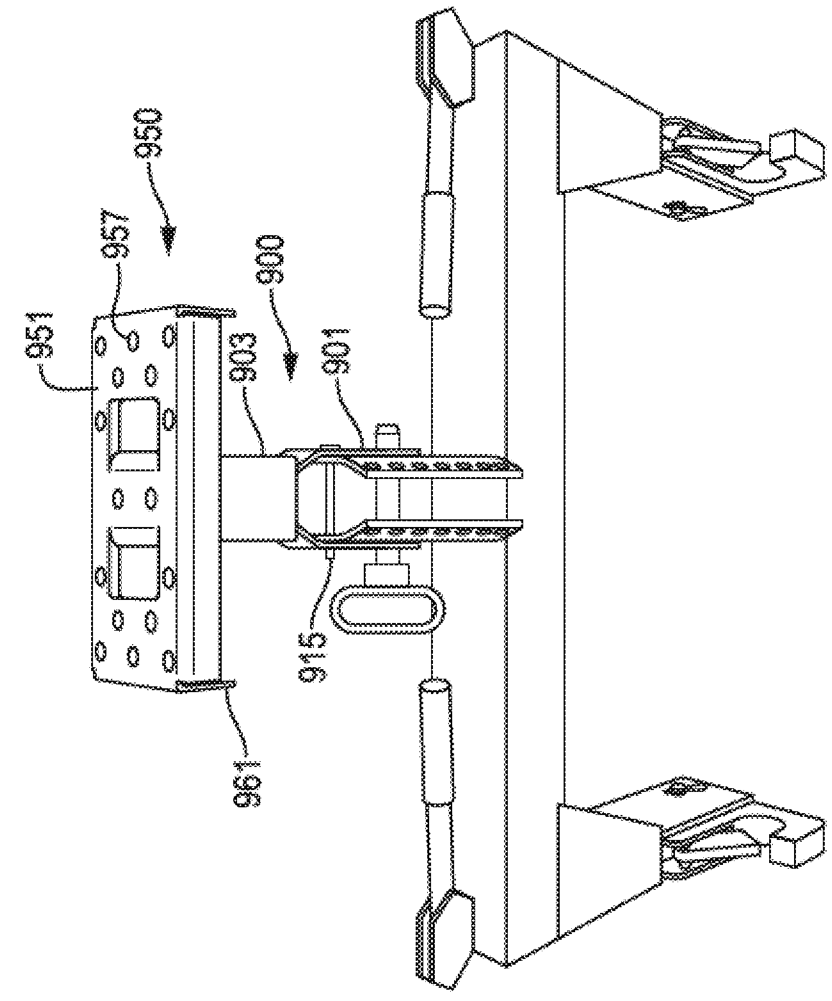
FIGS. 11A-11B illustrate images of various views of the alternative two-piece universal compact tractor storage system of FIG. 9A mounted on a quick hitch of a compact tractor in accordance with various embodiments.
Figure 11B:
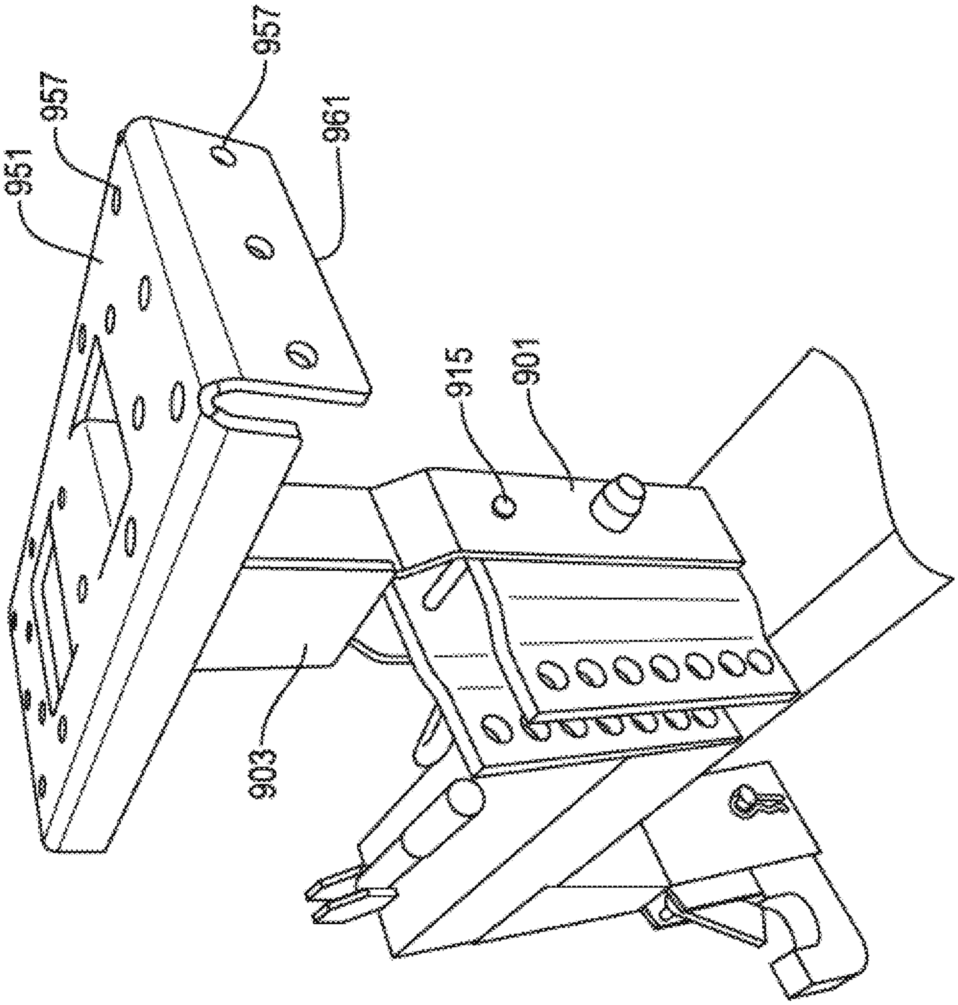
Figure 12A:
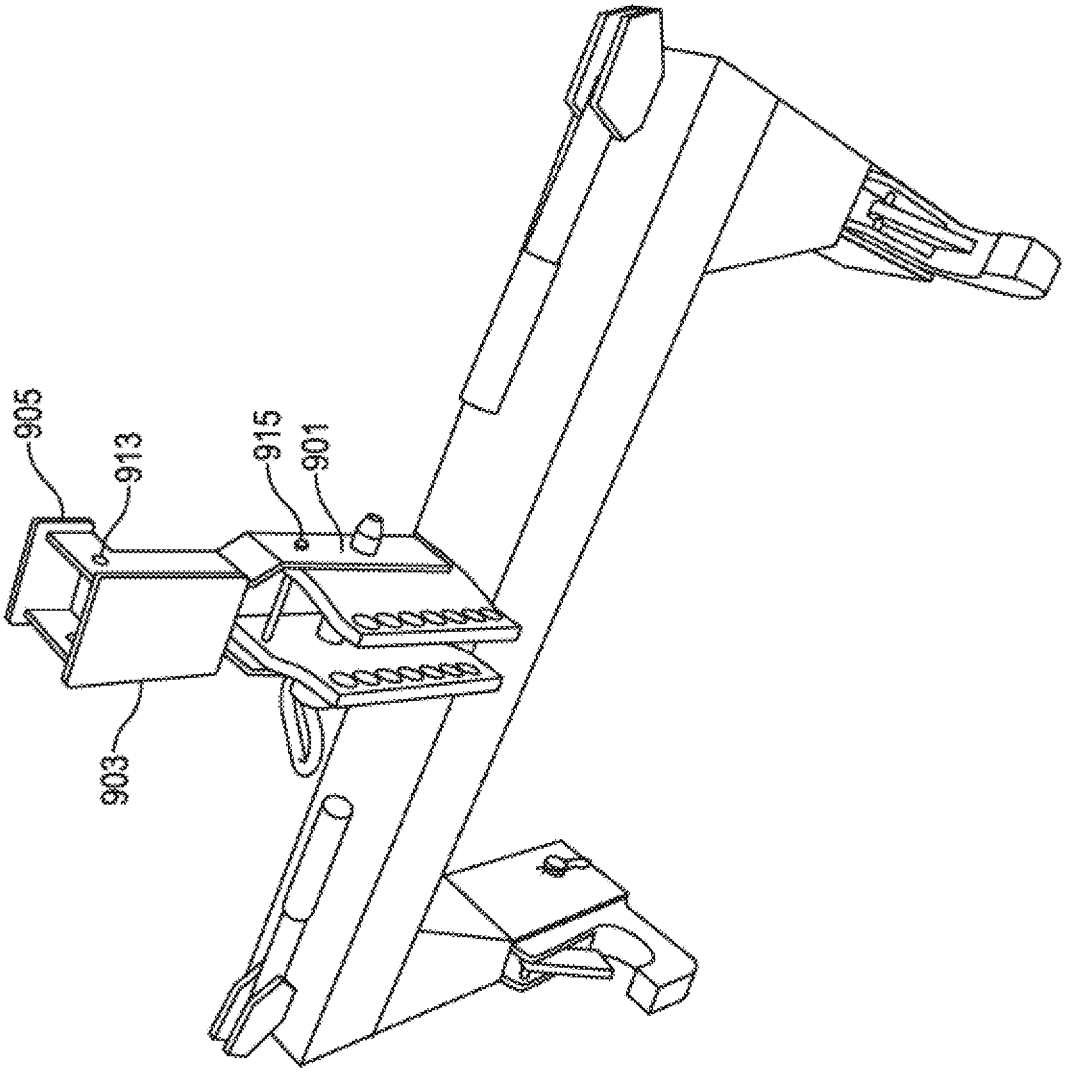
FIGS. 12A-12D illustrate images of various views of the mounting bracket of the alternative two-piece universal compact tractor storage system of FIG. 9A mounted on a quick hitch of a compact tractor in accordance with various embodiments.
Figure 12B:
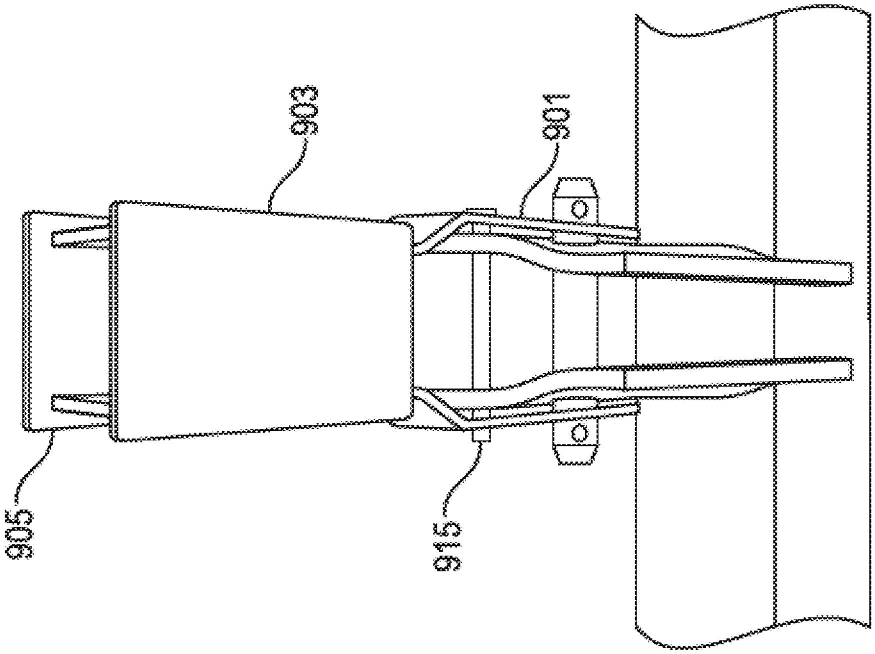
Figure 12C:
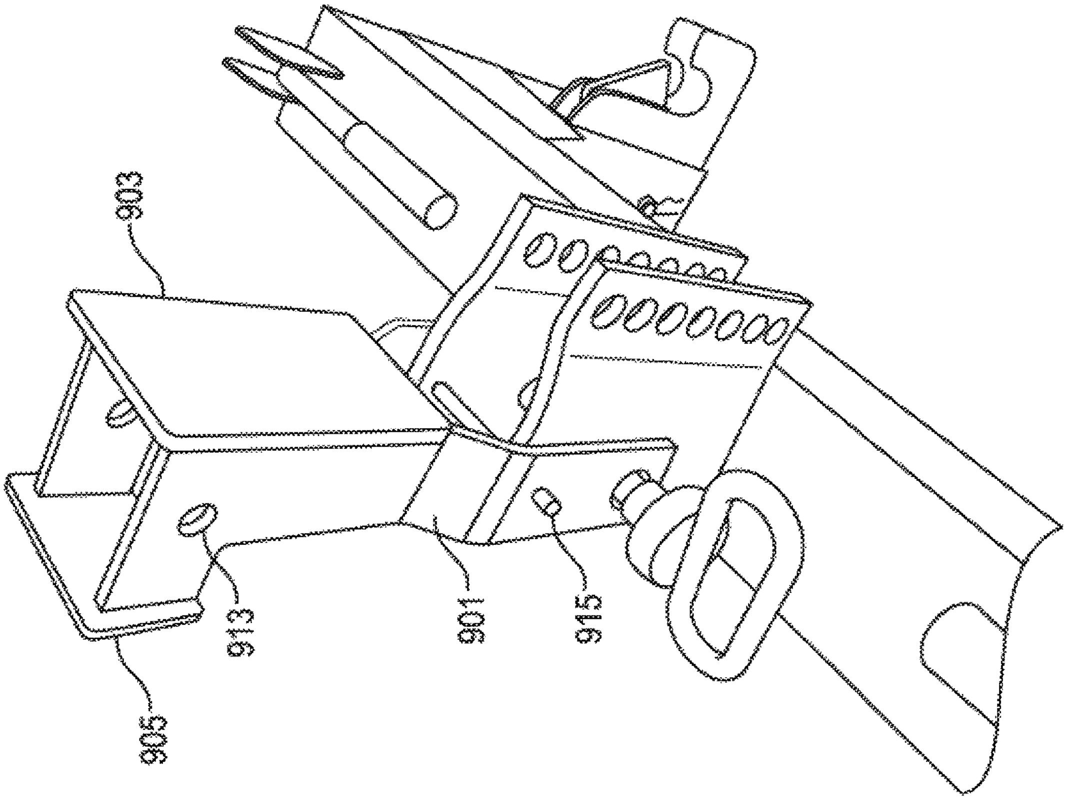
Figure 12D:
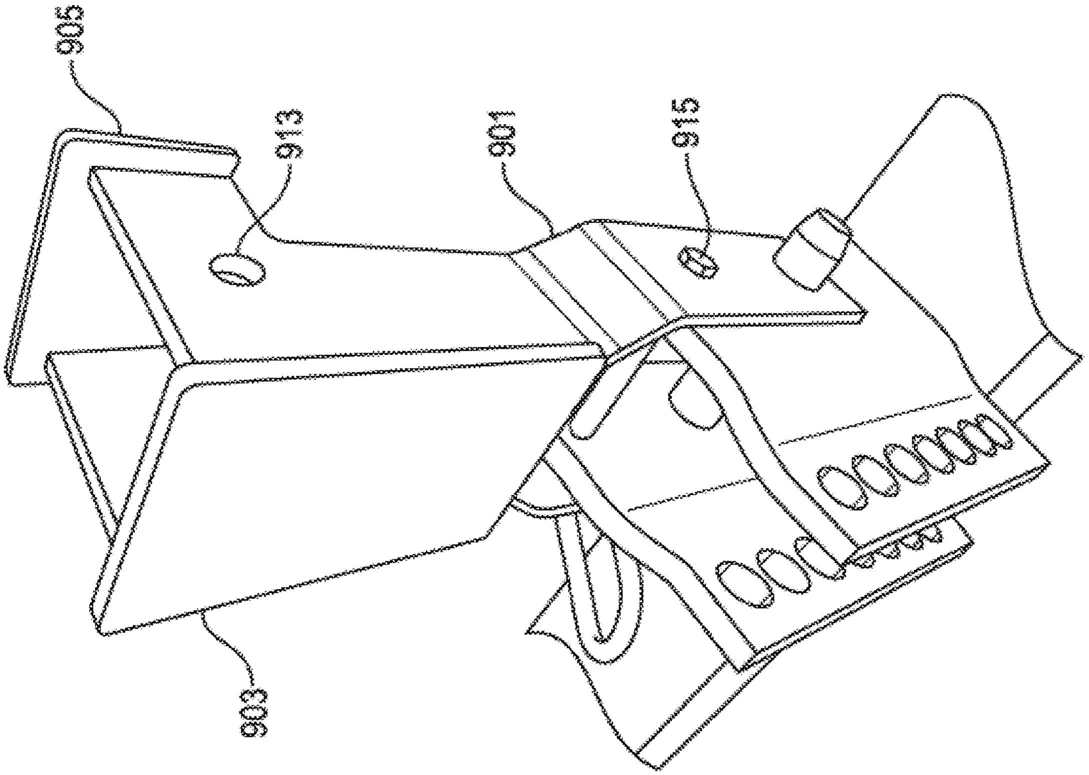

The front and rear flanges 903, 905 can generally be engaged and/or attached to the vertical mounting supports 901 by any suitable means including, for example, welding, brazing, adhesives, mechanical engagement, or combinations thereof. As shown, apertures of the front and rear flanges 903, 905 are mechanically engaged with one or more tabs 907 of the vertical mounting supports (e.g., two tabs 907 for the rear flange 905 as shown, for example, in FIG. 10C and four tabs 907 for the front flange 903 as shown, for example, in FIGS. 9C-9D and 10A-10B). The front and rear flanges 903, 905 can then be secured to the tabs 907 by, for example, welding or brazing. In some embodiments, the welded tabs can be filed, ground, sanded, or otherwise smoothed for a uniform exterior surface of the flanges (e.g., as shown in FIGS. 9B and 10D), which, in turn, can be painted as shown in FIGS. 11A-11B and 12A-12D. In addition, although shown herein as being a solid plate, the front flange 903, in some embodiments, can include a central hole formed therein (e.g., as shown and described above with reference to FIGS. 4A-8).

Generally, the vertical mounting supports 901 can be spaced apart such that the mounting bracket is sized to be fitted around the center link yoke of the quick hitch, wherein each vertical mounting support 901 includes an upper mounting hole 909 and a lower mounting hole 911, wherein the lower mounting hole 911 is configured to align with the mounting pin hole of the center link yoke itself. In this manner, the same center link mounting pin holding the quick hitch on the center link can be used to fasten the mounting bracket 900 of the universal compact tractor storage system 90 to the center link yoke of the quick hitch. Accordingly, the lower mounting holes 911 of the vertical mounting supports 901 can be sized for receiving a quick hitch center link mounting pin therethrough.

In some embodiments, the lower mounting holes 911 can form an open slot hole as shown. Advantageously, providing the lower open slot mounting holes 911 on the mounting bracket 900 permits the mounting bracket 900 to be secured to the center link yoke without removal of the quick hitch from the center link. Instead, the lower open slot mounting holes 911 can simply be slid over the center link mounting pin. This thereby eliminates the need to remove the center link when removing or installing the universal compact tractor storage system assembly 90.

The upper mounting holes 909 can generally be vertically located along the mounting supports to align with and be fitted around the center link yoke above the lower mounting holes 911 and in alignment with yoke through-holes. Although in some instances the center link yoke may have an additional through-hole other than the center link mounting pin holes, typically the center link yoke will not. As such, during initial installation, the user will typically need to drill through-holes in the center link yoke in alignment with the upper mounting holes 909. In this manner, an upper mounting bolt or pin 915 can be inserted through the upper mounting holes 909 and the drilled through-holes in the center link yoke in order to secure the mounting bracket 900 to the center link yoke and prevent rotation of the mounting bracket 900 relative to the center link yoke.

In general, because there are currently multiple manufacturers and models of 3-point quick hitches, each storage system may include a mounting bracket 900 having a width, hole size, and/or hole spacing configuration specific to a particular make and model of quick hitch. As such, in some embodiments, the vertical mounting supports 901 can be substantially straight and planar (e.g., as shown in FIGS. 4A-4I) and the width of the mounting bracket 900 can be adjusted by increasing or decreasing the spacing therebetween. Unfortunately, such an approach requires the production of quick hitch-specific models having different front and rear flanges 903, 905 as well as different baseplates 950 for mounting thereto. To avoid the need for fully customized front and rear flanges 903, 905 and to maintain baseplate 950 interchangeability between all models, in some embodiments, the width of an upper portion of the mounting bracket 900 (and the spacing between the vertical mounting supports 901) can be consistent throughout all models and a quick hitch-specific width can be achieved by shaping the vertical mounting supports 901 to symmetrically bend outward or inward to match the required width (e.g., as shown and described in connection with FIGS. 9A-12D below).

The vertical mounting supports 901 also include baseplate 950 assembly holes 913 in an upper portion thereof for receiving a baseplate 950 assembly bolt 925 or pin therethrough as described in further detail below.

Referring now to FIGS. 9A-9D, 10A-10D, and 11A-11B, the baseplate 950 can include a payload support plate 951 and two assembly tabs 953. The two assembly tabs 953 can extend downward from the payload support plate 951 and be spaced apart such that the assembly tabs 953 of the baseplate 950 are sized to be fitted against the vertical mounting supports 901 of the mounting bracket such that bracket assembly holes 955 of each tab are configured to align with the baseplate assembly holes 913 of each vertical mounting support 901. In this manner, the baseplate can be fixed to the mounting bracket 900 with a single through assembly bolt 925 or pin to allow rigid coupling of the two pieces, while still providing for quick and easy removal of the baseplate 950 from the mounting bracket 900. In general, use of an assembly pin for assembly of the baseplate 950 to the mounting bracket 900 offers the quickest release in the event a user plans to remove the baseplate 950 to transport a payload away from the tractor or change payload. By contrast, use of an assembly bolt 925 for assembly of the baseplate 950 to the mounting bracket 900 offers a more stable fit that is resistant to movement and rattling during operation of the tractor, while still providing for relatively quick and easy removal. In addition, the assembly tabs 953 can each have a width sized to be fitted between the front and rear flanges 903, 905 to prevent tipping of the baseplate 950 relative to the mounting bracket 900 via rotation about the assembly pin or bolt 925.

The payload support plate 901 can include a multitude of pre-drilled holes 957 and/or slots 959 for accommodating and/or securing nearly any payload, including, for example, a storage compartment, a box, or any other object that will meet the needs of the user and fit on the tractor. Such payload can be attached to the baseplate 950 using the provided holes 957, slots 959, and/or any other feature of the baseplate 950, by any suitable means, including, for example, by being bolted, strapped, adhered, or otherwise attached or secured to the baseplate 950. In some embodiments, the payload support plate 951 can include one or more sides 961. In some embodiments, two or more such sides 961 can be longer than the assembly tabs 953 in order to permit the payload support plate 951 to be set on a horizontal surface, with payload attached, without tipping over or needing to balance on the assembly tabs 953. Such vertical sides 961 may each include one or more holes 957 and/or slots 959 formed therein to provide additional options for payload securement.

The payload can generally be anything the user would like that fits the user's needs and falls within the size and space limitations of the tractor and the weight-bearing limits of the storage system. Because the storage system 90 is configured to be universal rather than requiring a specific standard payload, there are limitless possibilities for user configuration. Payloads can include anything from a milk crate to a toolbox to an ammo can, fuel tanks or cans, a pail or bucket, a tool rack, a tray, tools, gloves, shackles, rigging, hydration bottles, chainsaws, personal protective equipment, phones, radios, bug spray, fire extinguishers, food, or any other object the user wishes to transport or carry on the tractor.

In addition, because the baseplate 950 is removable from the mounting bracket 900, the user can advantageously have a variety of payloads, each attached to a separate baseplate 950. In this manner, when swapping payloads, instead of laboriously removing a first payload and then attaching a second, the user can quickly and easily remove a current baseplate 950 carrying the first payload and attach another base plate 950 carrying the second payload. During such a swap the mounting bracket 900 can remain attached to the quick hitch. In this manner, using a single mounting bracket 900, the user can have a customized, rapidly interchangeable set of payloads for storage and/or object transport.

Accordingly, in some applications, the universal compact tractor storage system 90 including both the mounting bracket 900 and one or more baseplates 950 can be provided as a kit. In other applications, each component of the storage system 90 may be available separately, thereby increasing versatility.

While example embodiments have been particularly shown and described, it will be understood by those skilled in the art that various changes in form and details may be made therein without departing from the scope of the embodiments encompassed or contemplated herein.

As used herein, "consisting essentially of" allows the inclusion of materials or steps that do not materially affect the basic and novel characteristics of the claim. Any recitation herein of the term "comprising", particularly in a description of components of a composition or in a description of elements of a device, can be exchanged with "consisting essentially of" or "consisting of".

What is claimed is:

1. A universal compact tractor storage system comprising:
a mounting bracket including:
opposing vertical mounting supports, the vertical mounting supports spaced apart to receive at least one of an upper hook yoke of a quick hitch or a center link yoke of a quick hitch therebetween;
a front flange extending between front edges of the opposing vertical mounting supports; and
a rear flange extending between rear edges of the opposing vertical mounting supports;
at least two mounting holes formed in each vertical mounting support, the mounting holes positioned to align with one or more holes of the upper hook yoke or the center link yoke and to receive a mounting bolt or mounting pin extending through the upper hook yoke or the center link yoke therethrough; and
a baseplate including:
a payload support plate; and
opposing assembly tabs extending substantially perpendicular to the payload support plate, the opposing assembly tabs spaced apart to receive the vertical mounting supports therebetween and each having a width sized to be inserted between the front and rear flanges, each of the assembly tabs including at least one bracket assembly hole corresponding to and aligned with a baseplate assembly hole of one of the vertical mounting supports and sized to receive an assembly bolt or assembly pin therethrough.

2. The system of claim 1, wherein a lower one of the mounting holes of each vertical mounting support is an open slot hole.

3. The system of claim 2, wherein the lower open slot holes of the mounting bracket are securable to the mounting bolt or mounting pin of the upper hook yoke of the quick hitch without removal of the mounting bolt or mounting pin from the quick hitch.

4. The system of claim 1, wherein the assembly tabs are sized to engage the front and rear flanges to prevent tipping of the baseplate relative to the mounting bracket.

5. The system of claim 1, wherein the payload support plate includes a plurality of holes and/or slots formed therein.

6. The system of claim 5, wherein the plurality of holes and/or slots are configured to permit securement of a payload.

7. The system of claim 6, wherein the payload includes one or more of a storage compartment, a box, a milk crate, a toolbox, an ammo can, a fuel tank, a fuel can, a pail, a bucket, a tool rack, a tray, tools, gloves, shackles, rigging, hydration bottles, chainsaws, personal protective equipment, phones, radios, bug spray, fire extinguishers, food, or combinations thereof.

8. The system of claim 5, wherein the payload is attachable to the baseplate by one or more of bolting, strapping, adhesion, or combinations thereof.

9. The system of claim 1, wherein the payload support plate includes one or more sides.

10. The system of claim 9, wherein two or more of the sides are longer than the assembly tabs.

11. The system of claim 9, wherein at least one of the sides includes one or more holes and/or slots formed therein.

12. The system of claim 1, wherein the payload support plate and the assembly tabs are constructed from a single piece, wherein the assembly tabs are folded perpendicular to the payload support plate.

13. The system of claim 1, wherein the payload support plate, the assembly tabs, and the sides are constructed from a single piece, wherein the assembly tabs and the sides are folded perpendicular to the payload support plate.

14. The system of claim 1, wherein the vertical mounting supports are substantially straight and a spaced apart distance between the vertical mounting supports is substantially constant.

15. The system of claim 1, wherein the vertical mounting supports are symmetrically shaped to provide a varying spaced apart distance between the vertical mounting supports wherein a first spaced apart distance between the vertical mounting supports along an upper portion thereof including the baseplate assembly holes is different than a second spaced apart distance between the vertical mounting supports at a lower portion thereof including the at least two mounting holes.

16. A universal compact tractor storage kit comprising:
a mounting bracket including:
opposing vertical mounting supports, the vertical mounting supports spaced apart to receive an upper hook yoke of a quick hitch or a center link yoke of a quick hitch therebetween;
a front flange extending between front edges of the opposing vertical mounting supports; and
a rear flange extending between rear edges of the opposing vertical mounting supports;
at least two mounting holes formed in each vertical mounting support, the mounting holes positioned to align with one or more holes of the upper hook yoke or the center link yoke and to receive a mounting bolt or mounting pin extending through the upper hook yoke or the center link yoke therethrough; and
a baseplate including:
a payload support plate, and
opposing assembly tabs extending substantially perpendicular to the payload support plate, the opposing assembly tabs spaced apart to receive the vertical mounting supports therebetween and each having a width sized to be inserted between the front and rear flanges, each of the assembly tabs including at least one bracket assembly hole corresponding to and aligned with a baseplate assembly hole of one of the vertical mounting supports and sized to receive an assembly bolt or assembly pin therethrough.

17. The kit of claim 16, further comprising at least one additional baseplate.

18. The kit of claim 16, further comprising the assembly bolt and/or the assembly pin.

19. The kit of claim 16, further comprising the mounting bolt and/or the mounting pin.

* * * * *